(12) United States Patent
Kawasaki et al.

(10) Patent No.: US 7,995,293 B2
(45) Date of Patent: Aug. 9, 2011

(54) IMAGE PICKUP LENS, IMAGE PICKUP APPARATUS, MOBILE TERMINAL, METHOD FOR MANUFACTURING IMAGE PICKUP LENS, AND METHOD FOR MANUFACTURING IMAGE PICKUP APPARATUS

(75) Inventors: Takashi Kawasaki, Hachioji (JP); Yasunari Fukuta, Hachioji (JP); Kazuki Matsui, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/836,406

(22) Filed: Jul. 14, 2010

(65) Prior Publication Data

US 2011/0013293 A1 Jan. 20, 2011

(30) Foreign Application Priority Data

Jul. 17, 2009 (JP) ................................ 2009-169231

(51) Int. Cl.
*G02B 9/34* (2006.01)
*G02B 3/02* (2006.01)
*G02B 9/04* (2006.01)
*G02B 13/18* (2006.01)

(52) U.S. Cl. ......... 359/793; 359/715; 359/717; 359/773

(58) Field of Classification Search .................. 359/715, 359/717, 771–774, 793–795
See application file for complete search history.

(56) References Cited

U.S. PATENT DOCUMENTS 7,821,725 B2 * 10/2010 Sato et al. ..................... 359/773

FOREIGN PATENT DOCUMENTS

| JP | 2006-323365 | 11/2006 |
| JP | 2008-233884 | 10/2008 |
| JP | 2008-287006 | 11/2008 |
| JP | 2009-236935 | 10/2009 |

* cited by examiner

*Primary Examiner* — Scott J Sugarman
(74) *Attorney, Agent, or Firm* — Cohen Pontani Liberman & Pavane LLP

(57) ABSTRACT

An image pickup lens includes: a first lens block with a positive power and a second lens block. The first lens block includes a first lens substrate, a lens portion 1*a* with a positive power, formed on an object-side surface of the first lens substrate, and a lens portion 1*b* with a negative power, formed on an image-side surface of the first lens substrate. The object-side surface of the lens portion 1*a* is a convex surface, and an image-side surface of the lens portion 1*b* is a concave surface. The second lens block includes a second lens substrate, and a lens portion 2*a* with a negative power, formed on an object-side surface of the second lens substrate. The object-side surface of the lens portion 2*a* is a concave surface. The image pickup lens satisfies the predetermined conditional expressions.

22 Claims, 15 Drawing Sheets

FIG. 3a
FIG. 3b
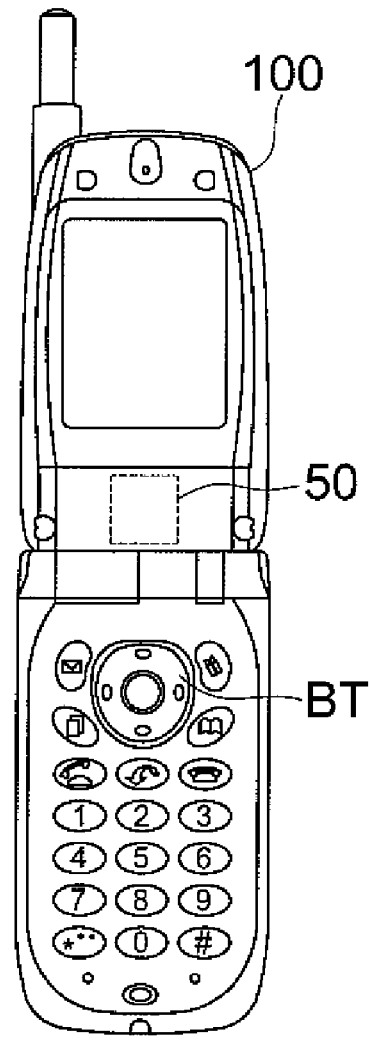
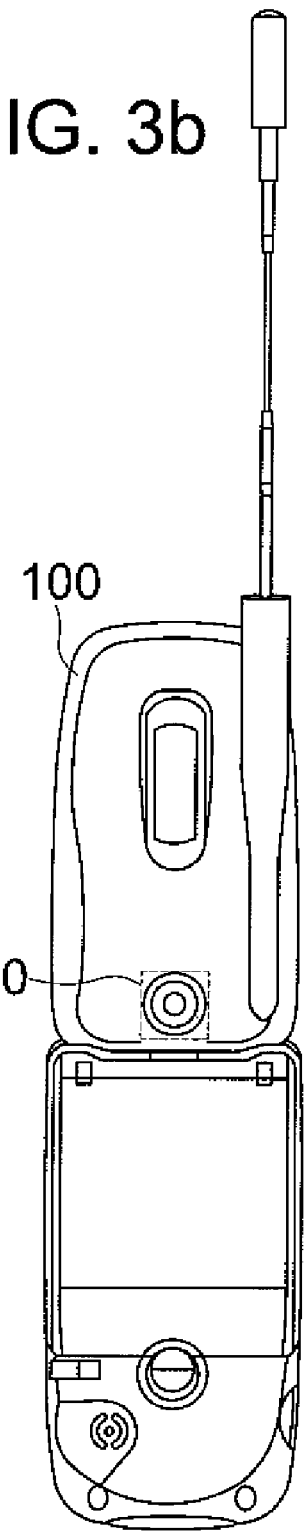

IMAGE PICKUP LENS, IMAGE PICKUP APPARATUS, MOBILE TERMINAL, METHOD FOR MANUFACTURING IMAGE PICKUP LENS, AND METHOD FOR MANUFACTURING IMAGE PICKUP APPARATUS

This application is based on Japanese Patent Application No. 2009-169231 filed on Jul. 17, 2009, in Japanese Patent Office, the entire content of which is hereby incorporated by reference.

TECHNICAL FIELD

The present invention relates to an image pickup lens of an image pickup apparatus employing a solid-state imaging device such as an image sensor of CCD (Charge Coupled Devices) type and an image sensor of CMOS (Complementary Metal-Oxide Semiconductor) type. More particularly, it relates to an image pickup lens in an optical system employing a wafer-scale lens suitable for mass production, an image pickup apparatus employing the image pickup lens, a mobile terminal, a method for manufacturing the image pickup lens and a method for manufacturing the image pickup apparatus.

BACKGROUND

A compact and thin-type image pickup apparatus has come to be mounted on a mobile terminal representing a compact and thin-type electronic hardware such as a cell phone and PDA (Personal Digital Assistant), whereby, it has become possible to transmit mutually not only voice information but also image information to a remote location.

As image pickup elements used for these image pickup apparatuses, a solid-state imaging device such as an image sensor of a CCD type and an image sensor of a CMOS type are used. In recent years, increase of pixel numbers of the image pickup element have been advanced, and enhancement of its resolution and performance have been attained. As a lens for forming an image of a photographic object on the imaging device, a lens made by resin that is suitable for mass production has come to be used for further cost reduction. In addition, the lens made by resin is excellent in terms of its workability and has satisfied requirements for enhancement of its performance, by being formed in aspheric shape because its workability is excellent.

As an image pickup lens of this kind used for an image pickup apparatus housed in a mobile terminal, an optical system of a three-element structure including three plastic lenses and an optical system of a three-element structure including one glass lens and two plastic lenses are widely known. However, a demand for further compactness for these image pickup lenses and a demand for mass productivity required for the mobile terminal are becoming stronger, and the compatibility between both demands is becoming more difficult.

To solve the problem, there has been proposed a method to produce a large number of lens modules as followings. There is provided a glass substrate in a size of several inches, which is formed in a parallel flat plate. A large amount of lens elements are simultaneously formed on the glass substrate through a replica method. Then, the glass substrate (lens wafer) on which a large number of lens elements are formed is combined with a sensor wafer and is cut off to produce a large number of lens modules. Lenses manufactured by this method are called wafer-scale lenses, and lens modules manufactured by this method are called wafer-scale lens modules.

Additionally to the method to produce a large number of lens modules, there has recently been suggested a method to mount the large number of lens modules on a substrate at low cost, as followings. Lens modules are arranged together with IC (Integrated Circuit) chips and other electronic parts on a substrate on which a solder is potted in advance. By adding reflow processing (heating processing) to the substrate to melt the solder as the lens modules are arranged thereon, the electronic components and the lens modules are simultaneously mounted on the substrate. Image pickup lenses that withstand reflow processing and are excellent in heat resistance are also demanded.

As the image pickup lens of this kind, there are proposed lenses shown in JP-B Nos. 3929479 and 3976781 which disclose lens blocks of a two-element structure. However, in these lenses, aberration correcting power is insufficient, and it is difficult to say that these image pickup lenses sufficiently copes with a solid-state imaging device with lager number of pixels. In particular, chromatic aberration is hardly corrected in these lenses, thereby, an image pickup lens shown in JP-A No. 2006-323365 in which a diffractive surface is applied on a lens substrate, and an image pickup lens in JP-A No. 2008-233884 in which an object-side lens and an image-side lens in a lens block are formed of different materials are also proposed.

However, in the image pickup lens shown in JP-A No. 2006-323365, employing the diffraction surface rises the degree of difficulty in manufacturing, and decreases diffraction efficiency for a wavelength other than a design wavelength. It generates a diffracted light of unwanted order, resulting in a problem of ghost. On the other hand, a structure of the image pickup lens in JP-A No. 2008-233884 enables to correct various aberrations in an excellent condition. However, the power of the first lens block of the image pickup lens is large in order to shorten the total length of the image pickup lens, and it easily enlarges sensitivity to a back focus when the first lens block has a thickness error. To solve the problem, controlling the dimension of the first lens block can be considered. However, lens portions formed on the opposing surfaces of a lens substrate in the first lens block are formed of resins with different refractive indexes, and it requires to control thicknesses of the lens portions on the opposing surfaces of the lens substrate and a thickness of the lens substrate from a viewpoint of manufacturing, which can be a primary factor to worsen a mass-productivity of the image pickup lens.

SUMMARY

The invention has been achieved in view of the aforesaid situations, to provide an image pickup lens exhibiting high quality at a low cost, an image pickup apparatus employing the image pickup lens, a mobile terminal, a manufacturing method of the image pickup lens, and a manufacturing method of the image pickup apparatus, by realizing an optical design of a wafer-scale lens whose structure is advantageous to shorten the total length of the optical system, makes a control of the dimension of the first lens block easy, and has aberrations which can exhibit high quality, and by realizing its mass-productivity.

The image pickup lens comprises, in order from an object side thereof a first lens block with a positive power and a second lens block, and satisfies predetermined conditional expressions. The fast lens block comprises a first lens substrate being a parallel flat plate; a lens portion 1a with a positive power, formed on the object side surface of the first lens substrate; and a lens portion 1b with a negative power, formed on the image side surface of the first lens substrate. An object side surface of the lens portion 1a is a convex surface facing the object side, and an image side surface of the lens portion 1b is a concave surface facing an image side. The second lens block comprises a second lens substrate being a parallel flat plate; and a lens portion 2a with a negative power, formed on the object side surface of the second lens substrate. An object side surface of the lens portion 2a is a concave surface facing the object side.

These and other objects, features and advantages according to the present invention will become more apparent upon reading of the following detailed description along with the accompanied drawings.

BRIEF DESCRIPTION OF DRAWINGS

Embodiments will now be described, by way of example only, with reference to the accompanying drawings which are meant to be exemplary, not limiting, and wherein like elements numbered alike in several Figures, in which:

FIGS. 3a and 3b are diagrams showing the state that a cell phone 100 is equipped with image pickup apparatus 50;

Figure 5A:
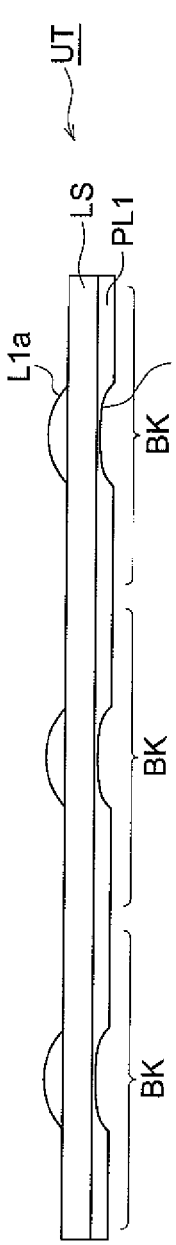
Figure 5B:
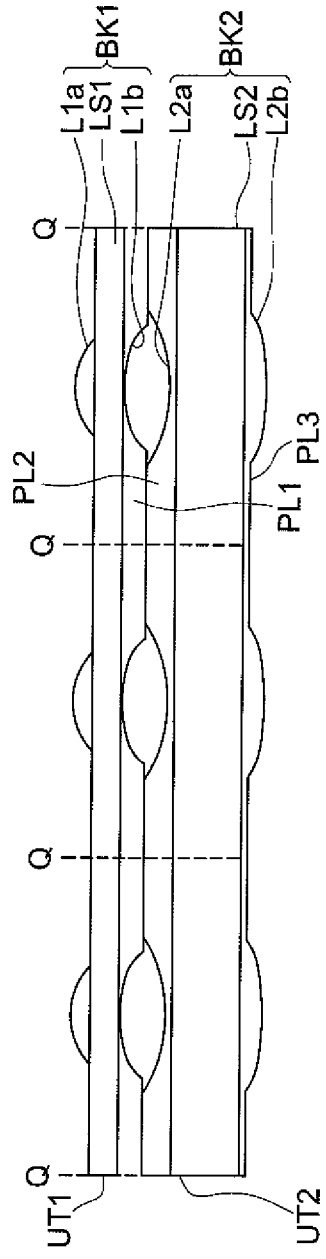
Figure 5C:
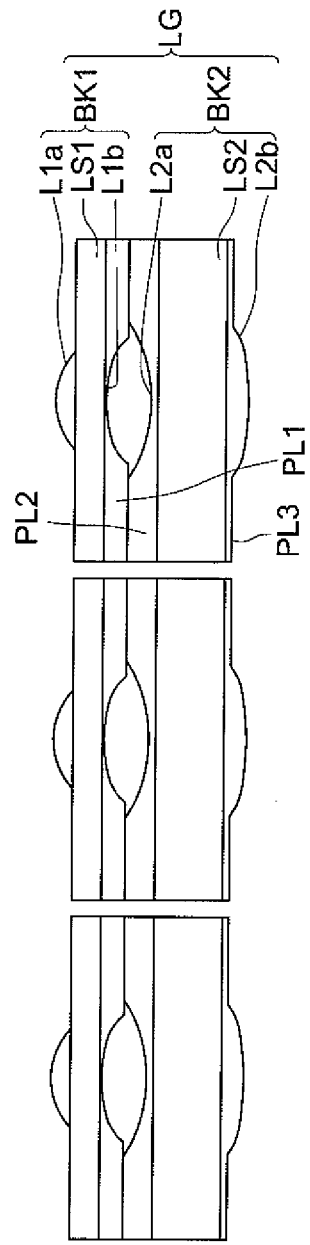
Figure 6:
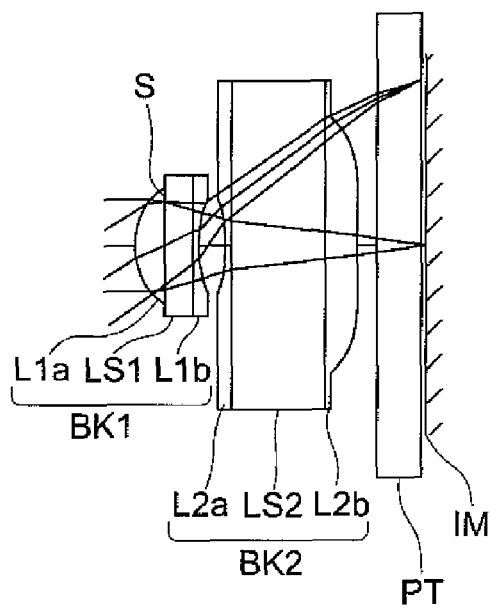
Figures 7A, 7B, 7C:
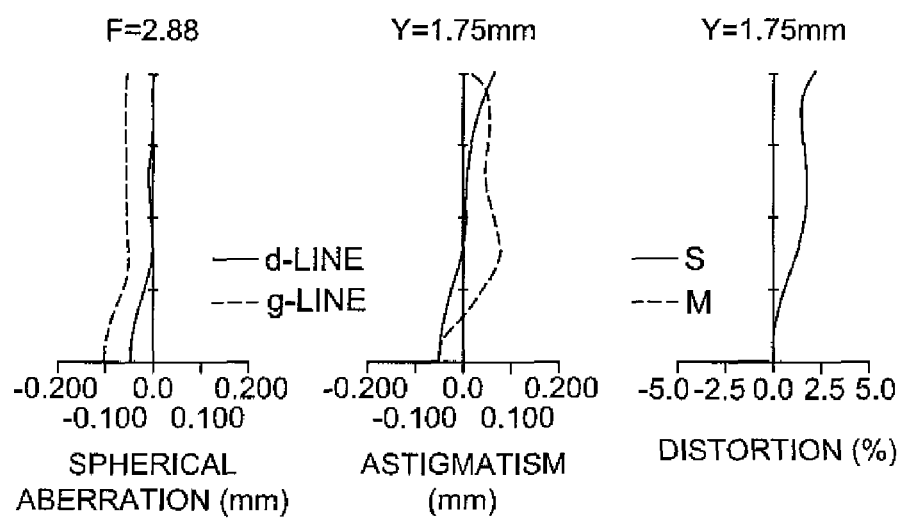
Figure 8:
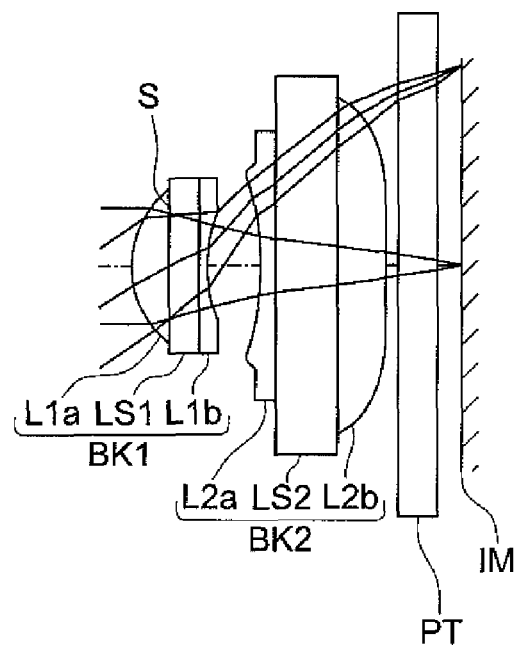
Figures 9A, 9B, 9C:
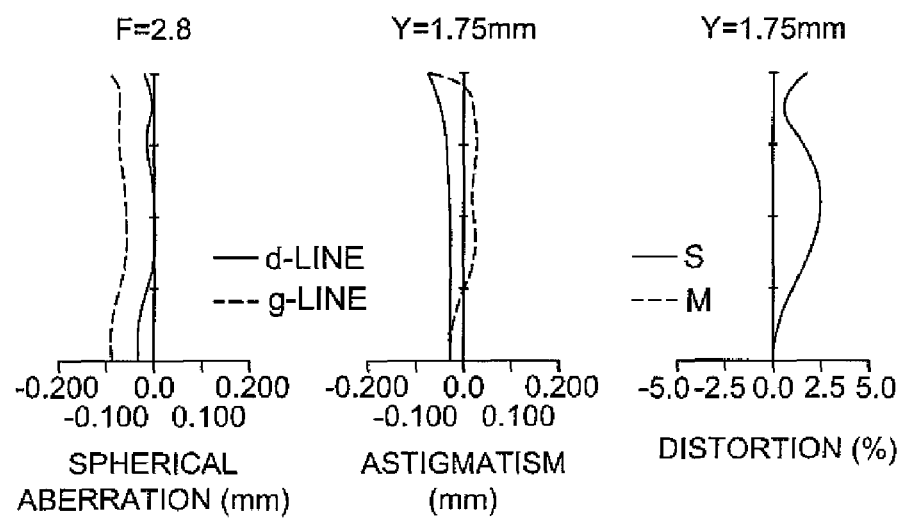
Figure 10:
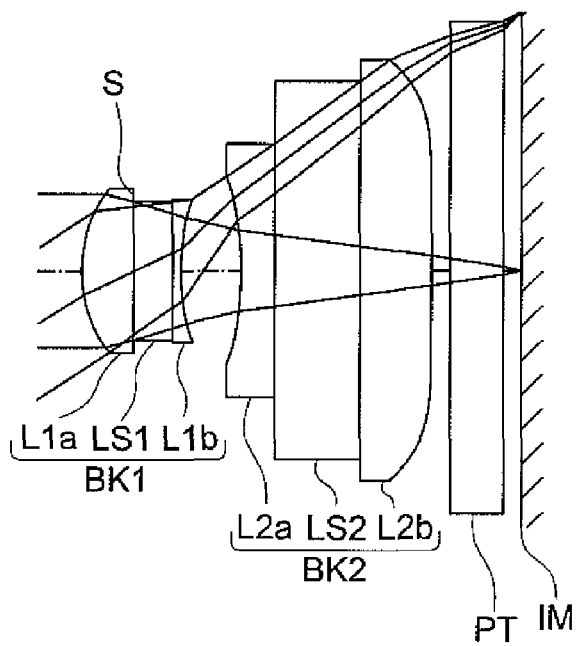
Figures 11A, 11B, 11C:
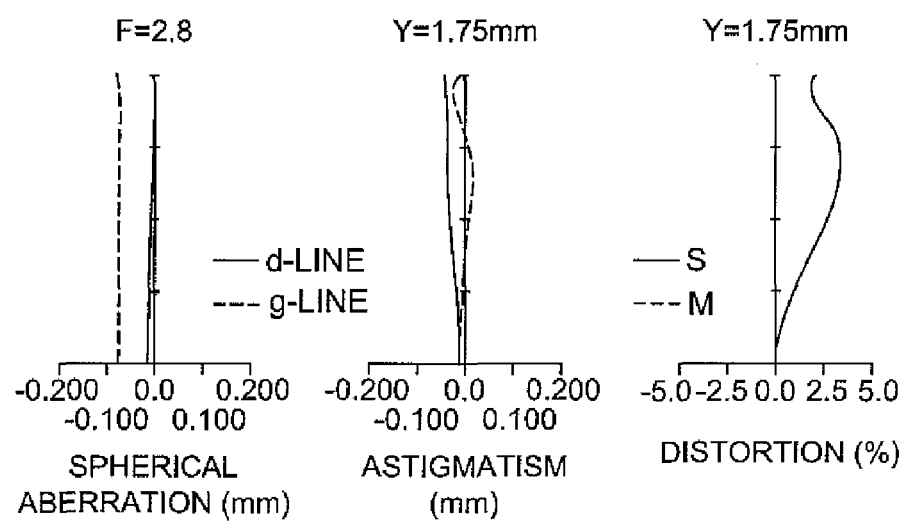
Figure 12:
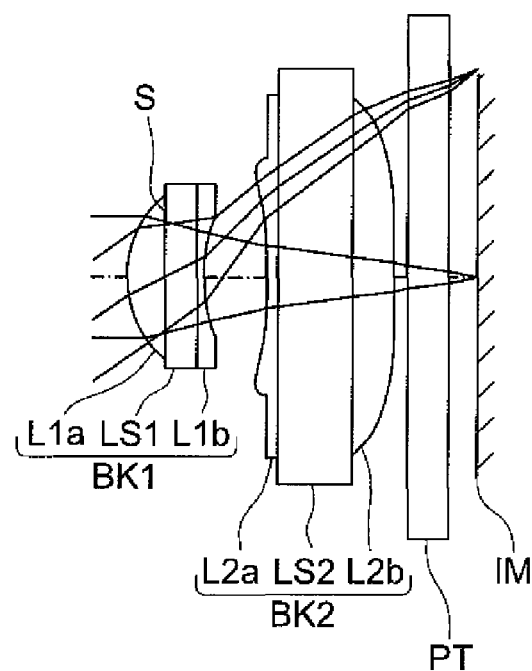
Figures 13A, 13B, 13C:
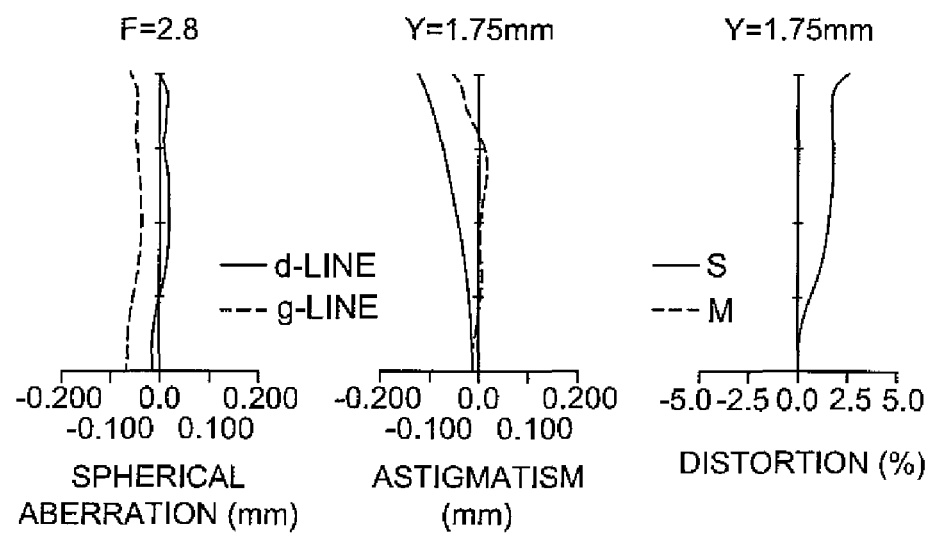
Figure 14:
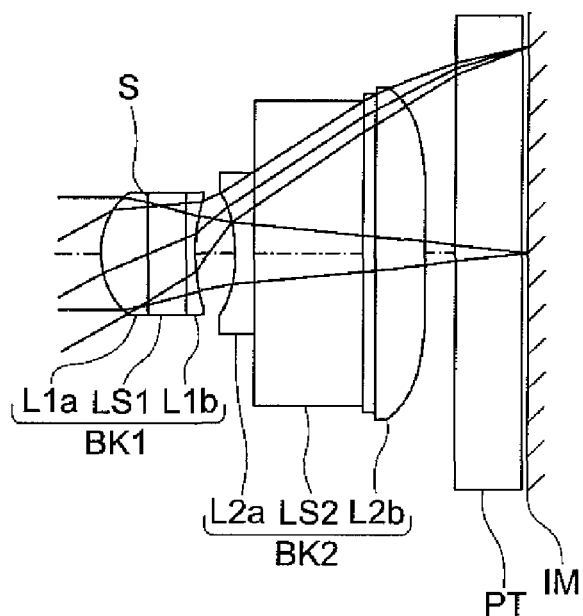
Figures 15A, 15B, 15C:
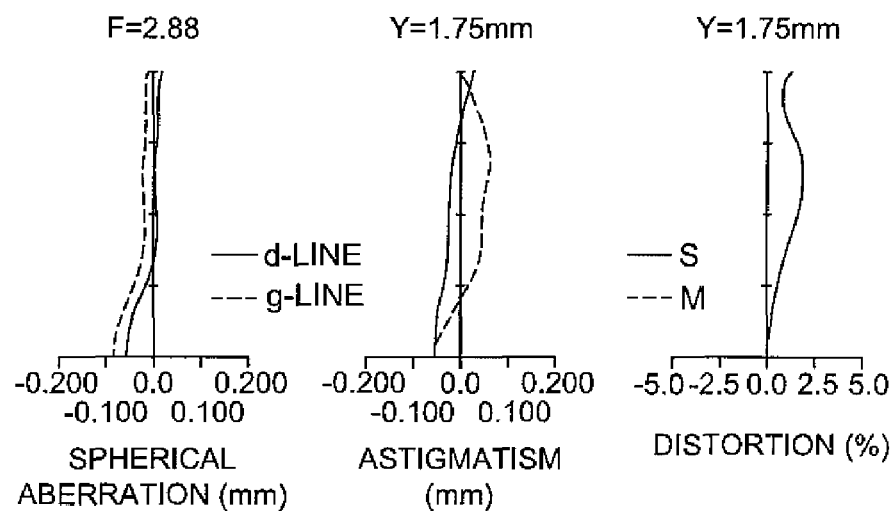
Figure 16:
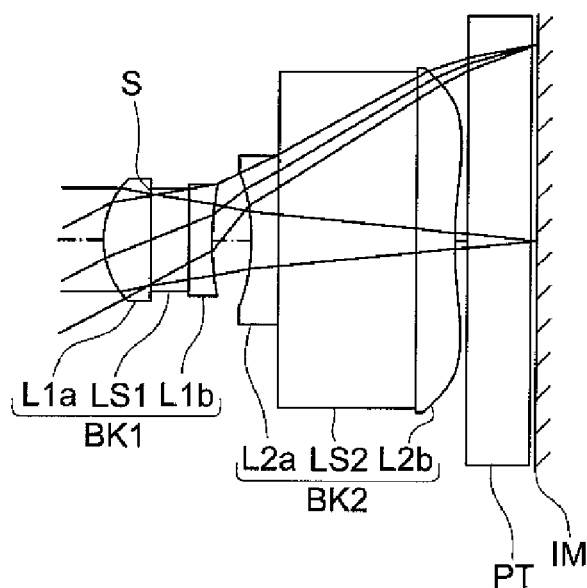
Figures 17A, 17B, 17C:
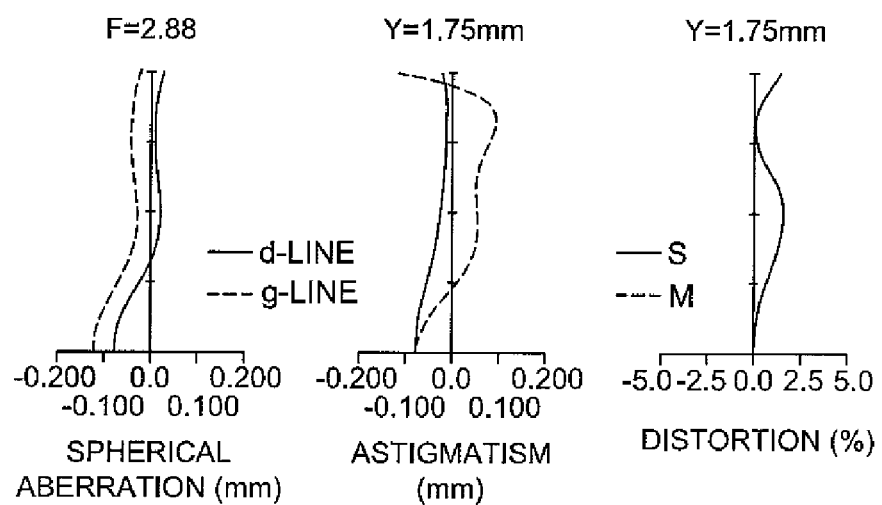
Figure 18:
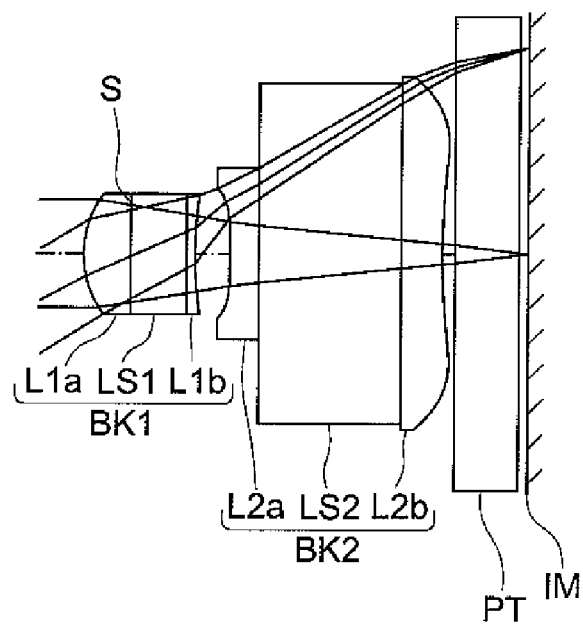
Figures 19A, 19B, 19C:
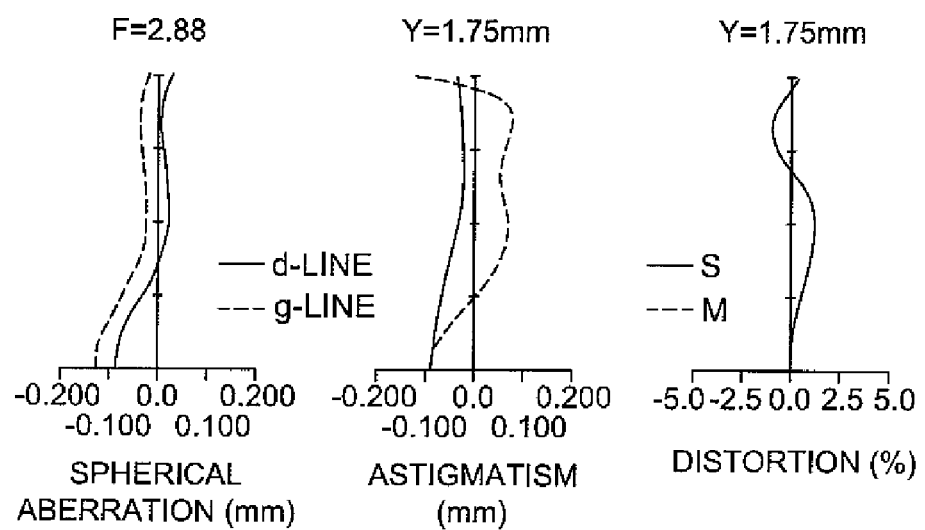
Figure 20:
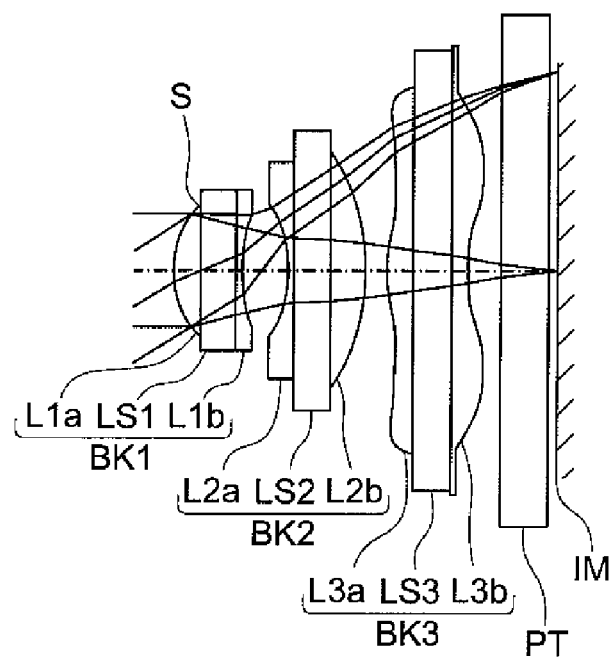
Figures 21A, 21B, 21C:
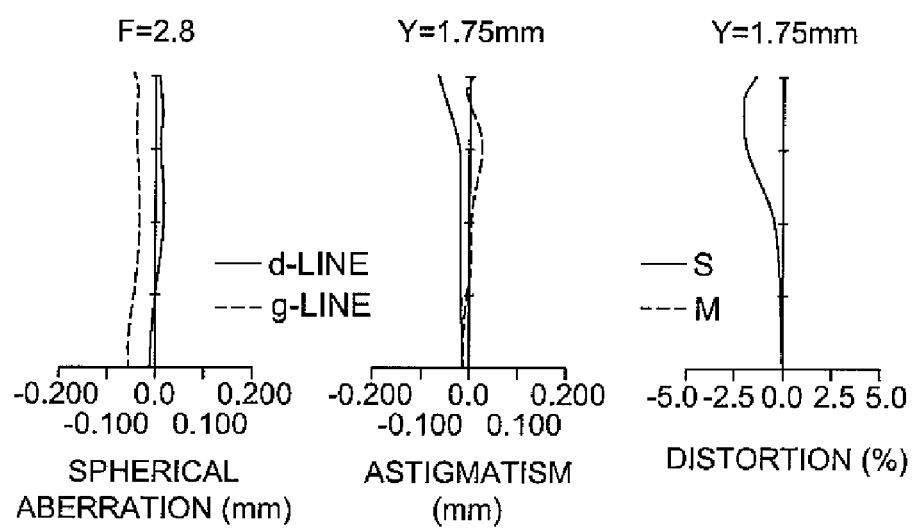
Figure 22:
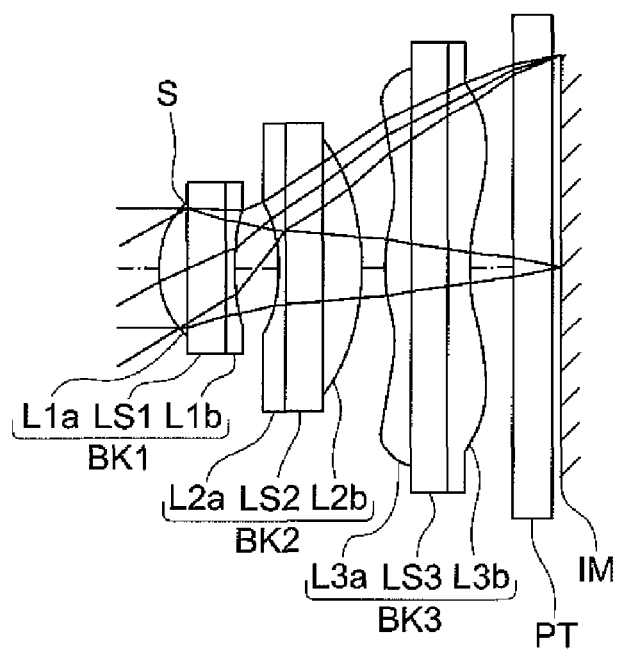
Figures 23A, 23B, 23C:
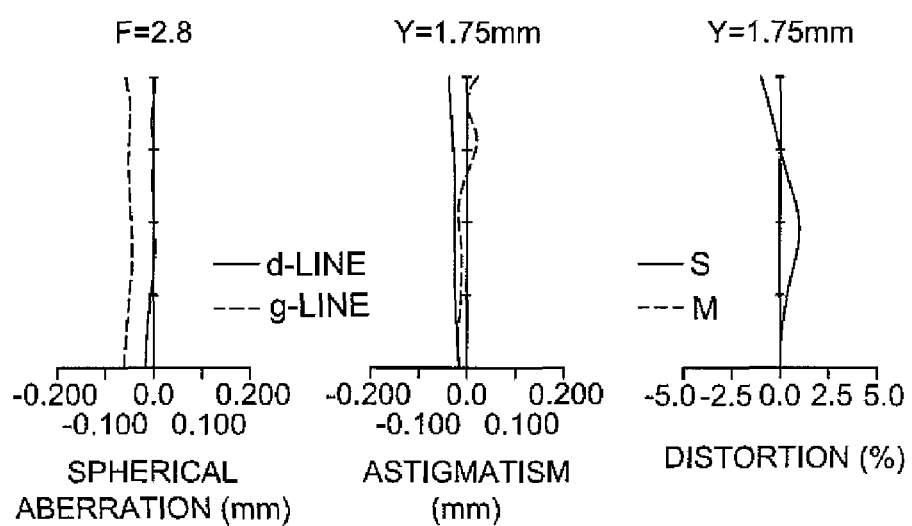
Figure 24:
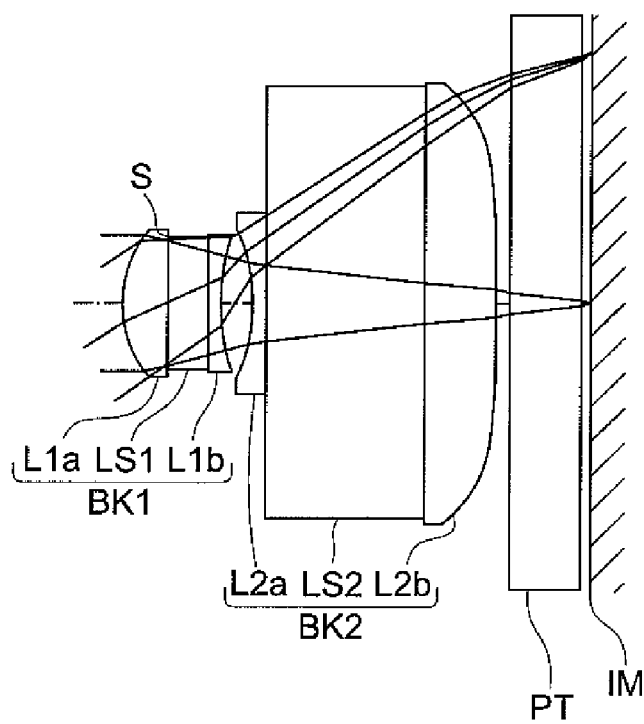
Figures 25A, 25B, 25C:
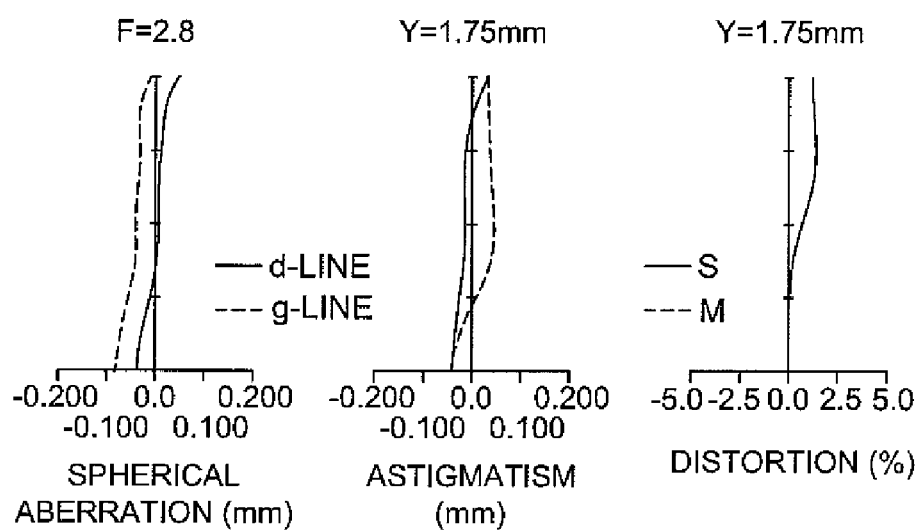
Figure 26A:
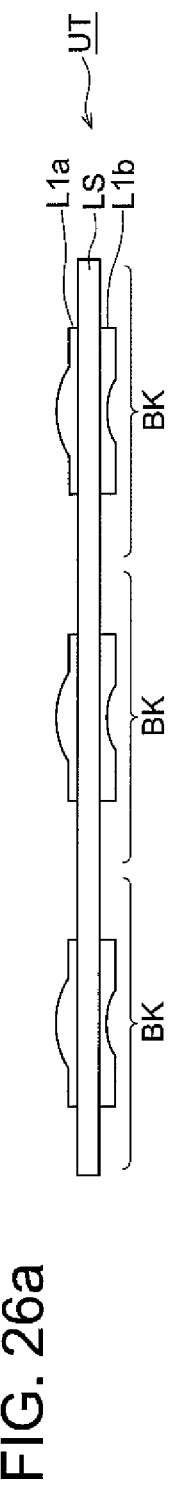
Figure 26B:
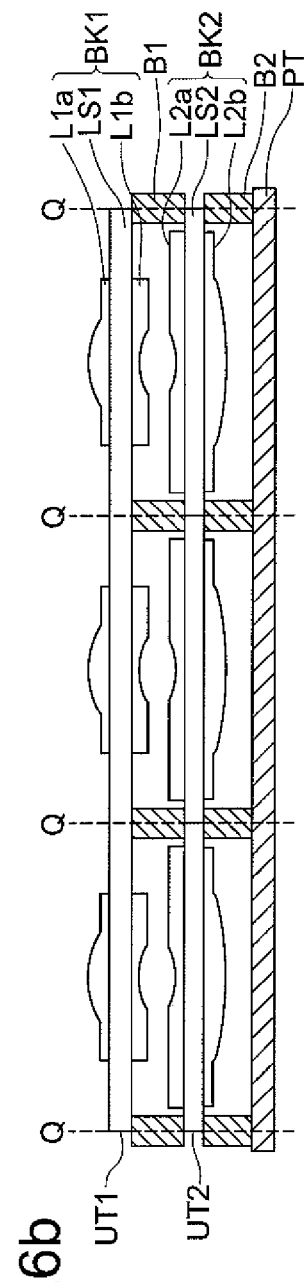
Figure 26C:
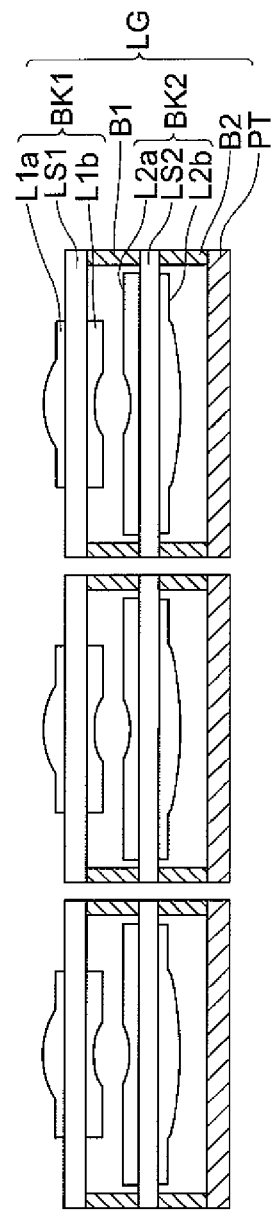

Each of FIGS. 5a, 5b and 5c is a diagram showing the manufacturing process of an image pickup lens;

FIG. 6 is a cross-sectional view of the image pickup lens relating to Example 1;

FIGS. 7a, 7b, and 7c are diagrams of spherical aberration, astigmatism and distortion of the image pickup lens relating to Example 1, respectively;

FIG. 8 is a cross-sectional view of the image pickup lens relating to Example 2;

FIGS. 9a, 9b, and 9c are diagrams of spherical aberration, astigmatism and distortion of the image pickup lens relating to Example 2, respectively, FIG. 10 is a cross-sectional view of the image pickup lens relating to Example 3;

FIGS. 11a, 11b, and 11c are diagrams of spherical aberration, astigmatism and distortion of the image pickup lens relating to Example 3, respectively;

FIG. 12 is a cross-sectional view of the image pickup lens relating to Example 4;

FIGS. 13a, 13b, and 13c are diagrams of spherical aberration, astigmatism and distortion of the image pickup lens relating to Example 4, respectively;

FIG. 14 is a cross-sectional view of the image pickup lens relating to Example 5;

FIGS. 15a, 15b, and 15c are diagrams spherical aberration, astigmatism and distortion of the image pickup lens relating to relating to Example 5, respectively;

FIG. 16 is a cross-sectional view of the image pickup lens relating to Example 6;

FIGS. 17a, 17b, and 17c are diagrams of spherical aberration, astigmatism and distortion of the image pickup lens relating to Example 6, respectively;

FIG. 18 is a cross-sectional view of the image pickup lens relating to Example 7;

FIGS. 19a, 19b, and 19c are diagrams of spherical aberration, astigmatism and distortion of the image pickup lens relating to Example 7, respectively;

FIG. 20 is a cross-sectional view of the image pickup lens relating to Example 8;

FIGS. 21a, 21b, and 21c are diagrams spherical aberration, astigmatism and distortion of the image pickup lens relating to relating to Example 8, respectively;

FIG. 22 is a cross-sectional view of the image pickup lens relating to Example 9;

FIGS. 23a, 23b, and 23c are diagrams spherical aberration, astigmatism and distortion of the image pickup lens relating to relating to Example 9, respectively, FIG. 24 is a cross-sectional view of the image pickup lens relating to Example 10;

FIGS. 25a, 25b, and 25c are diagrams spherical aberration, astigmatism and distortion of the image pickup lens relating to relating to Example 10, respectively; and Each of FIGS. 26a, 26b, and 26c is a diagram showing the manufacturing process of image pickup lens.

DESCRIPTION OF EMBODIMENTS

Embodiments of the present invention will be described below.

An embodiment of the present invention is an image pickup lens comprising, in order from an object side thereof: a first lens block with a positive power and a second lens block. The first lens block comprises a first lens substrate being a parallel flat plate; a lens portion 1a with a positive power, formed on the object side surface of the first lens substrate, and a lens portion 1b with a negative power, formed on the image side surface of the first lens substrate, where an object side surface of the lens portion 1a is a convex surface facing the object side, an image side surface of the lens portion 1b is a concave surface facing an image side; and an object side surface of the lens portion 2a is a concave surface facing the object side. The image pickup lens satisfies the following expressions.

$$0.6 < f1/f < 1.0 \quad (1)$$

$$0.00 < |n1a - n1s| < 0.06 \quad (2)$$

$$0.00 < |n1b - n1s| < 0.06 \quad (3)$$

$$0.00 \leq |n1a - n1b| < 0.05 \quad (4)$$

$$10 < v1a - v2a < 45 \quad (5)$$

In the expression, f1 is a focal length of the first lens block at d-line, f is a focal length of a total system of the image pickup lens at d-line, n1a is a refractive index of the lens portion 1a at d-line, n1b is a refractive index of the lens portion 1b at d-line, n1s is a refractive index of the first lens substrate, v1a is an Abbe number of the lens portion 1a, and v2a is an Abbe number of the lens portion 2a.

According to the embodiment, the image pickup lens comprises, in order from an object side thereof: a first lens block and a second lens block. The first lens block has a positive power. In the first lens block, an object side surface of the lens portion 1a is a convex surface facing the object side, an image side surface of the lens portion 1b is a concave surface facing an image side. The second lens block includes the lens portion 2a whose object side surface is a concave surface facing the object side. By providing the first lens block having a structure in which a convex surface faces the object side, as so-called a meniscus shape, a principal point of the total system of the image pickup lens can be placed closed to the object side, which enables to downsize the image pickup lens. By forming the lens portion 2a in to a concave surface, a strong negative power for correcting Petzval's sum can be shared by the lens portion 1b and the lens portion 2a. Thereby, various aberrations of the total system of the image pickup lens can be corrected in an excellent condition.

As for a dimension of a small-sized image pickup lens, downsizing at the level satisfying the following expression (11) is targeted. By satisfying this range, a small size and a light weight of the overall image pickup unit can be realized.

$$TL/2Y<1.5 \qquad (11)$$

In this expression, TL represents a distance along the optical axis from the lens surface closest to the object side in the total image pickup lens system to the focal point at the image side, and 2Y represents a length of a diagonal line of an image pickup surface of a solid-state image pickup element (a length of a diagonal line of a rectangular effective image pixel area of the solid-state image pickup element).

Herein, "the focal point at the image side" means an image point formed when a parallel light beam that is in parallel with the optical axis enters the image pickup lens. When a parallel flat plate such as an optical lowpass filter, an infrared blocking filter, a band-pass filter or a seal glass of a solid state image sensor package is arranged between a lens surface at the closest position to the image side in the image pickup lens and the focal point at the image side, the value of TL is calculated under the assumption that the space of the parallel flat plate is converted into an air distance.

A range of the following expression is more preferable. By satisfying the range defined by the expression (11'), the size and weight of the image pickup lens can be more reduced.

$$TL/2Y<0.9 \qquad (11')$$

By forming each of the first lens substrate and the second lens substrate to be a parallel flat plate, these lens substrates can be easily prepared and an influence of an surface accuracy to an focal position at the image plane can be reduced because the lens substrates do not have power at boundaries of the substrates and lens portions. Further, the lens substrates can be formed into the same shape to a wafer, which makes assembly of a wafer-scale lens easy.

The expression (1) is a conditional expression provided to control the total optical length of the image pickup lens to be small and to correct aberrations properly. When a value of the expression (1) is lower than the upper limit, the positive power of the first lens block can be strengthened and the total optical length of the image pickup lens can be shortened. When the value of the expression (1) exceeds the lower limit, the positive power of the lens portion 1a does not become excessively large, which avoids a remarkable deterioration of quality with keeping the small total optical length even when a slight decentration is caused during processing the lens portion 1a. Further, the following expression (1') is more preferable and the following expression (1") is further more preferable.

$$0.65<f1/f<0.9 \qquad (1')$$

$$0.7<f1/f<0.9 \qquad (1")$$

When the focal length of the first lens block reduces so as to satisfy the expression (1) for reducing the total optical length, an influence of the axial thickness of the first lens block to the back focus increases, which requires a control of an optical path length of the axial thickness with more accuracy. For example, in a glass substrate which is 20 cm in diameter, ten-something micrometers of manufacturing error in the substrate thickness remain. The present embodiment aims to provide an image pickup lens used for a solid image pickup element with 1.75 μm or 2.2 μm of pixel pitch. The depth of a focus is calculated by ±F×2P, where F is F-number and P is pixel pitch. Assuming that F is 2.8 and P is 1.75 μm, the following holds and the depth of a focus is about ±10 μm in this case.

$$\pm F \times 2P = \pm 2.8 \times 2 \times 1.75 \approx \pm 9.8$$

For an example of the present embodiment of the image pickup lens, tolerance of the axial length of the first lens block needs to be about 3 to 5 μm in order to place the back focus within the depth of the focus. When the substrate thickness has ten-something micrometers of error, the axial thickness of lens portions needs to be controlled so as to make the optical path length of the axial thickness of the lens block close to a design value of the optical path length of the axial thickness of the lens block. In other words, when refractive indexes of the lens portion 1a and lens portion 1b are largely different, a difference of the thickness of the first substrate from the design value needs to be converted into an optical path length of a resin of the lens portions to determine an adjustment amount of the lens portions. For example, when an error of thickness of the first lens substrate is represented by ΔDs and the error is corrected with the thickness of the lens portion 1a, the adjusting amount becomes ΔDs×n1a/n1s. When a margin for correction of the thickness of the lens portions formed on opposing surfaces of the substrate is so insufficient to require splitting the adjusting amount for the both sides of the substrate, each of split adjustment amounts need to be calculated, which is not thought as a easy correction. Herein, it is considered that the axial thickness of the lens block is adjusted with the axial thickness of the lens portions without converting the thickness into an optical path length in order to make the correction easy and that the axial thickness is brought close to the design value. Under the condition, error of back focus ΔfB caused when the axial thickness of the lens block changes by ΔDs×(n1a−n1s)/n1s remains. As described above, in the aimed image pickup lens in the present embodiment, the depth of focus is about ±10 μm, but the back focus error needs to be reduced to be about ±5 μm in order to provide an image pickup lens with higher performance. The back focus can also vary because of errors other than the error of the axial thickness of the first lens block. Therefore, the back focus error caused by the axial thickness of the first lens block is preferably as small as possible.

Therefore, the structure satisfying the expressions (2) to (4) is provided as the present embodiment to make the control of the axial thickness easy and to enable the accurate adjustment of the back focus. In other words, by providing the structure satisfying the expressions (2) to (4), three values of refractive indexes of two lens portions formed in the first lens block and a refractive index of the first lens substrate can be brought to be close, and amount of the back focus change becomes almost the same between when the axial thickness of the lens portion 1a is adjusted and when the axial thickness of the lens portion 1b is adjusted. Therefore, the back focus can be adjusted by adjusting the axial thickness of any one of the lens portion 1a and the lens portion 1b. Further, because the refractive indexes of the substrate and the lens portions have close values, the substrate and lens portion with the same thickness have almost the same optical path lengths. As a result, there is no need to control the respective axial thicknesses of the substrate and the lens portions, and the back focus error can be controlled to be small by bringing the axial thickness of the first lens block to the designed value.

When lens portions are formed out of a resin material on a glass substrate which is 20 cm in diameter, the substrate can be warped by stress caused by shrinkage of the resin material, which results in an inclination of the boundary of the substrate and lens portions. When refractive indexes of the substrate and the lens portions are largely different in this situation, a refraction cause by the inclination of the boundary can be a primary factor of asymmetric aberrations, which can be a primary factor to deteriorate the optical performance. However, because the refractive indexes of the substrate and the lens portions have close values, the refraction at the boundary becomes small and aberrations are not caused on the surface. Therefore, the warp of the substrate does not become a factor of the deterioration of the optical performance. The following expressions are preferable.

$$0.00 < |n1a - n1s| \leq 0.04 \quad (2')$$

$$0.00 < |n1b - n1s| \leq 0.04 \quad (3')$$

$$0.00 \leq |n1a - n1b| < 0.03 \quad (4')$$

Incidentally, when the expression (1) is satisfied, the power of the lens portion 1a in a convex shape becomes especially stronger in the first lens block, as a power of the first lens block is more strengthened. Corresponding to the strengthened power, a large chromatic aberration is caused. In a structure satisfying the expression (4), resins with similar refractive indexes generally can have similar Abbe numbers, which makes the correction of the chromatic aberration difficult Therefore, by making Abbe numbers of the lens portion 1b and the lens portion 2a to be close values, a large chromatic aberration caused in the lens portion 1a which is a convex surface, can be corrected by the chromatic aberration of the lens portion 2a which is a concave surface. Thereby, the chromatic aberration caused in the lens portion 1a can be canceled with the lens portion 2a, and chromatic aberration caused in the total system of the image pickup lens can be corrected in an excellent condition.

When a value of the expression (5) exceeds the lower limit, the chromatic aberration can be corrected easily. When the value is lower than the upper limit, the lens portions can be formed of a material which is easily available, which contributes to the reducing the cost. In other words, the present embodiment solves complex problems by providing the above structure, to realize an image pickup lens which is a optical system with a reduced total length, makes a control of the dimension of the first lens block easy, and has a aberration property to exhibit a high performance. As for the expression (5), the following expression (5') is more preferable and the following expression (5") is further more preferable.

$$14 \leq v1a - v2a < 40 \quad (5')$$

$$15 < v1a - v2a < 40 \quad (5'')$$

The above image pickup lens preferably satisfies the following expression.

$$50 < v1a < 70 \quad (6)$$

The lens portion 1a whose convex surface faces the object side has a large power in order to shorten the focal length of the first lens block so as to satisfy the expression (1), which causes a large longitudinal chromatic aberration. On the other hand, the expression (6) is a conditional expression to reduce the longitudinal chromatic aberration caused in the lens portion 1a, to realize high optical performance. By using a material with small dispersion (large Abbe number) so as to satisfy the expression (6), difference in focal length due to colors of light in the lens portion 1a becomes small, and longitudinal chromatic aberration caused in the total system of the image pickup lens becomes small. By using a material with the Abbe number which is lower than the upper limit of the expression (6), the lens portion 1a can be formed of a material which is easily available, which contributes to reducing the cost. The following expression is more preferable as for the expression (6).

$$52 < v1a < 65 \quad (6')$$

The image pickup lens preferably satisfies the following expression.

$$1.45 < n1b < 1.53 \quad (7)$$

The expression (7) is a conditional expression provided to control field curvature to be small, to realize high optical performance, and to control a generation of unwanted light. When a material with low refractive index which is lower than the upper limit of the expression (7) is used for lens portion 1b whose concave surface faces the image side, a negative Petzval sum becomes great, which works in a direction to cancel a large positive Petzval sum generated in lens portion 1a. Further, as for a ray entering the image pickup lens at an angle which is larger than an incident angle of a ray corresponding to the maximum image height, when the ray enters lens portion 1b at more than the critical angle, a total internal reflection occurs and the my can become unwanted light. The unwanted light sometimes affects an image. When the expression (7) is satisfied, the critical angle of lens portion 1b increases and the amount of rays exhibiting the total internal reflection decreases, which can reduce the amount of the unwanted light. Further, by using a material with a refractive index which is larger than the lower limit of the expression (7), the lens portion can be formed of a material which is easily available. It contributes to reducing the cost. Herein, the range of the following expression is more preferable.

$$1.47 < n1b < 1.52 \quad (7')$$

The above image pickup lens preferably satisfies the following expression.

$$20 < v2a < 50 \quad (8)$$

Lens portion 1b has a concave surface facing the image side and generates a chromatic aberration such that a large longitudinal chromatic aberration generated in lens portion 1a is cancelled. However, when a material with a low refractive index satisfying the expression (7) is selected, the amount of chromatic aberration to cancel the longitudinal chromatic aberration becomes small, because a material with a low refractive index has generally a small dispersion (large Abbe number) and a generation amount of the chromatic aberration becomes small. Therefore, by forming lens portion 2a whose concave surface faces the object side out of a material with a large dispersion (small Abbe number), lens portion 2a can generate a chromatic aberration so as to cancel the longitudinal aberration of lens portion 1a. By reducing the Abbe number v2a to be lower than the upper limit of the expression (8), the longitudinal chromatic aberration generated in the total system of the image pickup lens can be corrected to be a good condition. Herein, the range of the following expression is more preferable.

$$25 \leq v2a < 50 \quad (8')$$

The above image pickup lens preferably satisfies the following expression.

$$0.0 < f1b/f2a < 1.0 \quad (9)$$

In the expression, f1b is a focal length of the lens portion 1b at d-line, measured when the lens portion 1b is arranged in the air, and f2a is a focal length of the lens portion 2a at d-line, measured when the lens portion 2a is arranged in the air.

The expression (9) is a conditional expression provided to correct various aberrations including a chromatic aberration in well-balanced and excellent condition. When a value of f1b/f2a exceeds the lower limit of the expression (9), the power of lens portion 1b does not become excessively strong, and high order aberrations such as coma flare generated in lens portion 1b can be controlled. When the value of f1b/f2a becomes lower than the upper limit of the expression (9), lens portion 2a having a large dispersion (small Abbe number) has a strong power and the longitudinal chromatic aberration can be corrected in a excellent condition. Herein, the range of the following expression is more preferable.

$$0.2 < f1b/f2a < 0.8 \tag{9'}$$

In the above image pickup lens, the lens portion 1a and the lens portion 1b are preferably formed of a same resin material.

By forming the lens portions 1a and 1b out of the same resin material, the difference in refractive index between the lens portions 1a and 1b becomes zero and it makes the structure most preferable among structures with conditions satisfying the expression (4). Further, in an example that the lens portions are formed of UV-curable resin, the both lens portions can use the almost same conditions such as temperature and time for a post-curing step which is applied after a UV-curing step, where the post-curing step is a treatment to accelerate the curing of the material by heating the material at the other place than the molding process, without reference of a condition that the molded body is removed from the mold or not in the step. Such the structure enables to add the post-curing step to the opposing surfaces at the same time, which is preferable in view of productivity.

In the above image pickup lens, a surface arranged at a closest position to the image side in the image pickup lens, preferably has an aspheric shape which is convex or concave facing the image side around an optical axis and is convex facing the image side at a peripheral portion where a principal ray corresponding to a maximum image height passes through the surface.

On the lens portion arranged at the closest position to the image side, the height of an on-axis ray is low. Therefore, it can be considered that its influence to the focal length and the spherical aberration is small. Accordingly, when the lens portion is formed to have a convex shape around the optical axis, a positive refraction can be applied to light at the position closest to the image plane and incident angle to a sensor surface can be controlled without changing the focal length and the spherical aberration. When the lens portion is formed to have a concave shape around the optical axis, Petzval sum can be controlled to be small without changing the focal length and the spherical aberration. When a peripheral area where the principal ray corresponding to the maximum image height passes through, on the lens portion is formed into a convex shape facing the image side, the area can apply a positive refraction to the ray to be formed into an image on the image periphery. Therefore, an incident angle of the ray to a sensor can be controlled and distortion which is inclined to be large in the plus direction can be corrected to an excellent condition.

In the above image pickup lens, a material forming the surface arranged at the closest position to the image side preferably satisfies the following expression.

$$1.53 < nI < 1.70 \tag{10}$$

In the expression, nI is a refractive index at d-line of the material forming the surface arranged at the closest position to the image side.

As described above, when the peripheral area of the lens portion arranged at the position closest to the image has a strong positive power, the incident angle to the sensor around the image periphery can be controlled to be small. Such the lens portion is inclined to be thick and to makes the lens molding more difficult. By employing a material with high refractive index which is more than the lower limit of the expression (10), the lens portion can be controlled not to be thick and aberrations can be corrected in an excellent condition. By employing a material with high refractive index which is less than the upper limit of the expression (10), the lens portion can be formed of a material which is easily available, which contributes to save the cost. Herein, the range of the following expression is more preferable.

$$1.55 < nI < 1.65 \tag{10'}$$

In the above image pickup lens, each of the first lens substrate and the second lens substrate is preferably formed of a glass material.

Glass has a higher softening temperature than plastic. By providing lens substrates made of glass, the lens substrates hardly vary even after a reflow treatment and the cost can be reduced. It is more preferable to employ glass with high softening temperature.

In the above image pickup lens, each of the lens portions 1a, 1b, and 2a is preferably formed of a resin material.

By forming respective lens portions out of a plastic material, their processability and moldability are enhanced and the cost can be reduced.

In the above image pickup lens, the resin material preferably includes a curable resin material.

By forming the lens portions out of curable resin material, a great number of lens portions can be cured on a lens substrate in a shape of wafer with a mold at the same time by various methods, and mass-productivity is enhanced.

A curable resin material includes a resin material which is hardened by heat or a resin material which is hardened by light. The curable resin material preferably includes a UV-curable resin material. By employing UV-curable resin material, curing time can be reduced and mass-productivity can be enhanced. In recent years, resin and curable resin which have outstanding heat resistance have been developed and such the materials can stand up to a reflow treatment.

As for the above resin material, inorganic microparticles which are 30 nm or less in size may be dispersed in the resin material.

By dispersing inorganic microparticles which are 30 nm or less in size into a lens portion formed of a resin material, it is possible to provide an image pickup lens in which deterioration of property and change of image-point position are reduced without lowering of light transmittance despite of temperature change, to exhibit an excellent optical property despite of environmental change.

In general, if fine particles are mixed in a transparent resin material, light scatters therein and it causes lowered transmittance. Therefore, it has been difficult to use such a material as an optical material. However, by making a size of microparticles to be smaller than a wavelength of a transmitting light flux, occurrence of light scattering can be prevented substantially.

Further, though it has been a drawback of resin material that its refractive index is lower than that of glass material, it has found that the refractive index can be made to be high, by dispersing inorganic particles having high refractive index in a resin material representing base material. Specifically, it is possible to offer the material having an arbitral refractive index, by dispersing inorganic particles of a size of 30 nanometer or less, preferably of 20 nanometer or less, more preferably 15 nanometer or less, into a plastic material serving as a base material.

The refractive index of a resin material is lowered if a temperature rises. However, when there are prepared inorganic particles whose refractive index rises if a temperature rises, and when the inorganic particles are dispersed in the resin material serving as a base material, properties of both parties act on each other to cancel, thus, fluctuations of refractive index for temperature changes can be made small. Further, on the contrary, when there are prepared inorganic particles whose refractive index declines if a temperature rises, and when the inorganic particles are dispersed in the resin material serving as a base material, fluctuations of refractive index for temperature changes can be made to be large. Specifically, it is possible to offer materials having arbitral temperature-dependency, by dispersing inorganic particles of a particle size of 30 nanometer or less, preferably 20 nanometer or less, more preferably 15 nanometer or less, into a plastic material serving as a base material.

For example, when inorganic particles such as aluminum oxide ($Al_2O_3$) or lithium niobate ($LiNbO_3$) are dispersed in an acrylic resin, it is possible to obtain a plastic material having high refractive index and to make fluctuations of changes in refractive index for temperature changes to be small.

Next, refractive index change A due to temperature will be explained in detail as follows. The refractive index change A due to temperature is expressed by the following expression (12) by differentiating a refractive index with respect to temperature t, based on Lorentz-Lorenz equation.

$$A = \frac{(n^2+2)(n^2-1)}{6n} \left\{ (-3\alpha) + \frac{1}{[R]} \frac{\partial [R]}{\partial t} \right\} \quad (12)$$

In the expression above, $\alpha$ represents the coefficient of linear expansion, and [R] represents molecular refraction.

In the case of resin materials, a contribution of the second term to the refractive index change is generally smaller than that of the first term in the expression, and it can be mostly neglected. For example, in the case of PMMA resins, coefficient of linear expansion $\alpha$ is $7\times10^{-5}$. When it is substituted in the aforesaid expression, $dn/dt=-1.2\times10^{-4}$ [° C.] holds to agree generally with actual measurements.

In this case, by dispersing fine particles in a resin material, or by dispersing inorganic microparticles in a resin material desirably, the contribution of the second term in the aforesaid expression is made to be substantially large so that it may offset with a change by linear expansion of the first term each other. Specifically, it is desirable that the change which has been about $-1.2\times10^{-4}$ is controlled to be less than $8\times10^{-5}$ in an absolute value.

It is further possible to exhibit a temperature dependency which is opposite to that of a resin material representing a base material, by further increasing the contribution of the second term. In other words, it is also possible to obtain a raw material whose refractive index is raised rather than declined when temperature rises.

A mixing ratio of the particles can be varied properly for controlling a change rate of a refractive index for temperature, and it is also possible to disperse inorganic particles such that plural types of particles in nano-sizes are blended. Such the resin material is disclosed in JP-A No. 2007-126636.

It is preferable that the above image pickup lens further comprises a first resin portion arranged on the image-side surface of the first lens substrate, and a second resin portion arranged on the object-side surface of the second lens substrate, wherein a surface of the first resin portion includes the lens portion 1b, a surface of the second resin portion includes the lens portion 2a, and the surface of the first resin portion including the lens portion 1b and the surface of the second resin portion including the lens portion 2a are joined together with an adhesive.

According to the above structure, there is no need to arrange a spacer as a separated body between the lens portions. It realizes an image pickup lens which allows an easy management of the dimension of the first lens block and an aberration property which enables to achieve a high performance, as an optical system with reduced total length.

Another embodiment of the present invention is an image pickup apparatus comprising any one of the above image pickup lenses. According to the structure, an image pickup apparatus with high performance can be provided at a low cost.

Another embodiment of the present invention is a mobile terminal comprising the above image pickup apparatus. According to the structure, a mobile terminal with high performance can be provided at a low cost.

Another embodiment of the present invention is a method for manufacturing the above image pickup lens, comprising the step of preparing the first lens substrate and the second lens substrate. The first lens substrate includes a plurality of the lens portions 1a formed on one surface of the first lens substrate, and a plurality of the lens portions 1b formed on the other surface of the first lens substrate such that optical axes of the lens portions 1a coincide with optical axes of the corresponding lens portions 1b. The second lens substrate includes a plurality of the lens portions 2a formed on one surface of the second lens substrate. The method further comprises the steps of arranging the first lens substrate and the second lens substrate such that the plurality of lens portions 1b and the plurality of lens portions 2a face each other, and adjusting positions of the first lens substrate and the second lens substrate. The method further comprises the steps of: joining the first lens substrate and the second lens substrate together after adjusting positions of the first lens substrate and the second lens substrate; and cutting the first lens substrate and the second lens substrate which are joined together, to form image pickup lenses each comprising a combination of the first lens block and the second lens block.

This embodiment can provide an image pickup lens which is an optical system with a reduced total length, allows easy dimension management of the first lens block, and has an aberration property achieving a high performance. Further, the embodiment can mass-produce the image pickup lenses as water-scale lenses.

In the above method, the first lens substrate and the second lens substrate may be joined together through a spacer member with an adhesive after adjusting positions of the first lens substrate and the second lens substrate, and the first lens substrate, the second lens substrate and the spacer member which are joined together, are preferably cut to form image pickup lenses each comprising a combination of the first lens block and the second lens block.

This embodiment does not cause the problem that offcut made in the cutting step enters the lens and affects its optical property.

Another embodiment of the present invention is a method for manufacturing the above image pickup lens, comprising the step of: preparing the first lens substrate and the second lens substrate. The first lens substrate includes a plurality of the lens portions 1a formed on one surface of the first lens substrate and includes the first resin portion on the other surface of the first lens substrate, and a surface of the first resin portion includes a plurality of the lens portions 1b such that optical axes of the lens portions 1a coincide with optical axes of the corresponding lens portions 1b. The second lens substrate includes the second resin portion arranged on one surface of the second lens substrate, and a surface of the second lens substrate includes a plurality of the lens portions 2a. The method further comprises the steps of arranging the first lens substrate and the second lens substrate such that the surface of the first resin portion including the plurality of lens portions 1b and the surface of the second resin portion including the plurality of lens portions 2a face each other, and adjusting positions of the first lens substrate and the second lens substrate. The method further comprises the steps of joining the surface of the first resin portion and the surface of the second resin portion together with an adhesive after adjusting positions of the first lens substrate and the second lens substrate; and cutting the first lens substrate and the second lens substrate to form image pickup lenses each comprising a combination of the first lens block and the second lens block, after joining the surface of the first resin portion and the surface of the second resin portion.

This embodiment can provide an image pickup lens which is an optical system with a reduced total length, allows easy dimension management of the first lens block, and has an aberration property achieving a high performance. Further, the embodiment can mass-produce the image pickup lenses as water-scale lenses.

In the above method, when joining the surface of the first resin portion and the surface of the second resin portion, the first resin portion and the second resin portion are preferably joined together such that combinations of the lens portion 1b and the lens portion 2a facing each other are sealed between the first resin portion and the second resin portion with the adhesive.

According to the embodiment, there is no need to arrange a spacer member as a separated body between the lens portions, and there is few possibility that offcut made in cutting step enters the lens. It provides an image pickup lens which is an optical system with a further reduced total length, allows easy dimension management of the first lens block, and has an aberration property achieving a high performance. Further, the embodiment can mass-produce the image pickup lenses as water-scale lenses.

Another embodiment of the present invention is a method for manufacturing an image pickup apparatus comprising the above image pickup lens, comprising the step of preparing the first lens substrate and the second lens substrate. The first lens substrate includes a plurality of the lens portions 1a formed on one surface of the first lens substrate and a plurality of the lens portions 1b formed on the other surface of the first lens substrate such that optical axes of the lens portions 1a coincide with optical axes of the corresponding lens portions 1b. The second lens substrate includes a plurality of the lens portions 2a formed on one surface of the second lens substrate. The method further comprises the steps of arranging the first lens substrate and the second lens substrate such that the plurality of lens portions 1b and the plurality of lens portions 2a face each other, and adjusting positions of the first lens substrate and the second lens substrate. The method further comprises the steps of joining the first lens substrate and the second lens substrate after adjusting positions of the first lens substrate and the second lens substrate; adjusting positions of the first and second lens substrates which are joined together and a image-pickup-element substrate including a plurality of image pickup elements, and joining the first and second lens substrates and the image-pickup-element substrate together, cutting the first and second lens substrates and the image-pickup-element substrate which are joined together, to form image pickup lenses each comprising a combination of the first lens block, the second lens block, and the image pickup element, after joining the first and second lens substrates and the image-pickup-element substrate together.

Accordingly, image pickup apparatuses each including an image pickup element can be mass-produced all together in wafer scale.

In the above method, the first lens substrate and the second lens substrate may be joined together through a spacer member with an adhesive after adjusting positions of the first lens substrate and the second lens substrate. Further, the first lens substrate, the second lens substrate, the spacer member, and the image-pickup-element substrate which are joined together, may be cut to form image pickup lenses each comprising a combination of the first lens block, the second lens block, and the image pickup element, after joining the first and second lens substrates and the image-pickup-element substrate together.

This embodiment does not cause the problem that offcut made in cutting step enters the lens and affect its optical property.

Another embodiment of the present invention is a method for manufacturing an image pickup apparatus comprising the above image pickup lens, comprising the step of preparing the first lens substrate and the second lens substrate. The first lens substrate includes a plurality of the lens portions 1a formed on one surface of the first lens substrate and includes the first resin portion on the other surface of the first lens substrate, and a surface of the first resin portion includes a plurality of the lens portions 1b such that optical axes of the lens portions 1a coincide with optical axes of the corresponding lens portions 1b. The second lens substrate includes the second resin portion arranged on one surface of the second lens substrate, and a surface of the second lens substrate includes a plurality of the lens portions 2a. The method further comprises the steps of arranging the first lens substrate and the second lens substrate such that the surface of the first resin portion including the plurality of lens portions 1b and the surface of the second resin portion including the plurality of lens portions 2a face each other, and adjusting positions of the first lens substrate and the second lens substrate. The method further comprising the steps of joining the surface of the first resin portion and the surface of the second resin portion together with an adhesive, after adjusting positions of the first lens substrate and the second lens substrate; adjusting positions of the first and second lens substrates which are joined together and a image-pickup-element substrate including a plurality of image pickup elements, and joining the first and second lens substrates and the image-pickup-element substrate together, cutting the first lens and second lens substrates and the image-pickup-element substrate which are joined together, to form image pickup lenses each comprising a combination of the first lens block, the second lens block, and the image pickup element, after joining the first and second lens substrates and the image-pickup-element substrate together.

Accordingly, image pickup apparatuses each including an image pickup element can be mass-produced all together in wafer scale.

According to the above embodiments, there can be provided an image pickup lens, image pickup apparatus, and mobile terminal which exhibit high performance at a reduced cost by achieving a design of wafer-scale lens which is advantageous to reduce the total length, allows easy dimension management of the first lens block, and exhibits aberration property achieving high performance, to realize mass-production of the lenses.

Figure 1:
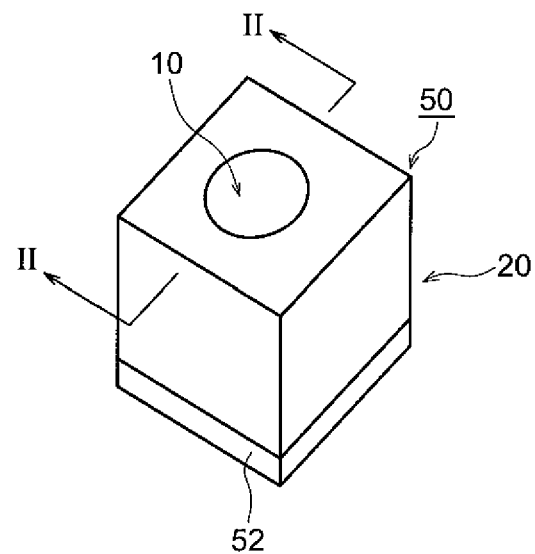
FIG. 1 is a perspective view of image pickup apparatus 50 relating to the present embodiment.
Figure 2:
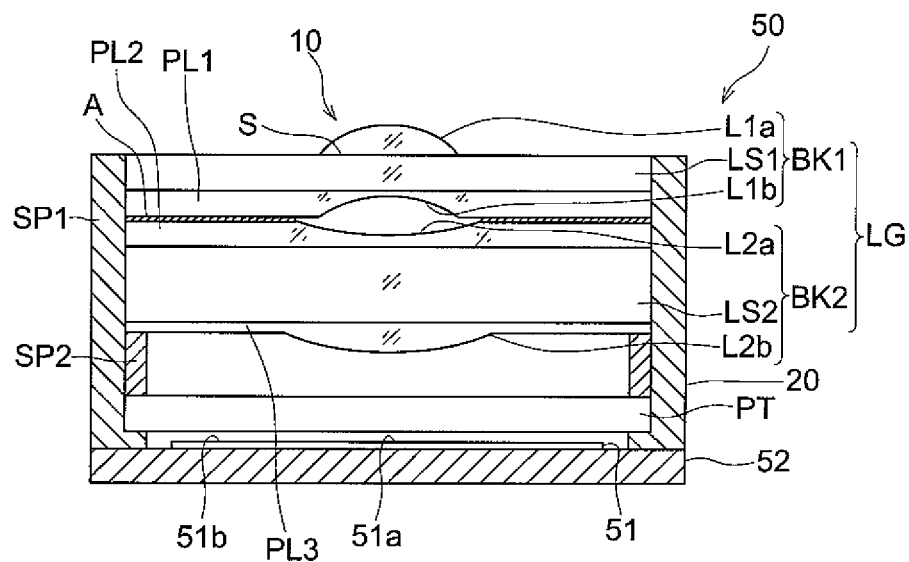
FIG. 2 is a cross-sectional view of the composition shown in FIG. 1 which is taken by following arrows II-II and are viewed in the direction of the arrows.

A preferred embodiment of the invention will be explained as follows, with referring to the drawings. FIG. 1 is a perspective view of image pickup apparatus 50 relating to the present embodiment, and FIG. 2 is a cross-sectional view of the compositions shown in FIG. 1 which are taken on arrows II-II and are viewed in the direction of the arrows. As shown in FIG. 2, image pickup apparatus 50 is equipped with image sensor 51 of a CMOS type, image pickup lens 10 and substrate 52, which are formed in one body. The image sensor 51 of a CMOS type representing a solid-state imaging device includes photoelectric converting section 51a. The image pickup lens 10 forms an image of a photographic object on photoelectric converting section 51a of the image sensor 51. The substrate 52 holds image sensor 51 and includes an external connecting terminal that conducts transmission and reception of electric signal. Incidentally, the image pickup lens 10 is supported by casing 20, and includes first lens block BK1 and second lens block BK2 in this order from the object side.

At the central portion on a plane facing at the light receiving side of the image sensor 51, photoelectric conversion section 51a serving as a light receiving section is formed. Pixels (photoelectric conversion elements) are arranged on the photoelectric conversion section 51a on a two-dimensional basis. Signal processing circuits are formed on the surroundings of the photoelectric conversion section 51a. The signal processing circuit of this kind is composed of a drive circuit section that drives each pixel in succession to obtain signal electric charges, A/D conversion section that converts each signal electric charge into a digital signal, and a signal processing section that forms image signal output by using this digital signal. Further, in the vicinity of the outer edge of the light-receiving-side plane of the image sensor 51, there are arranged many pads (not illustrated) which are connected to substrate 52 through wires. The image sensor 51 converts signal electric charges coming from the photoelectric conversion section 51a into image signal such as digital YUV signal, and outputs it to prescribed circuits on substrate 52 through wires. In this case, Y represents luminance signal, U (=R−Y) represents color difference signal between red signal and luminance signal and V (=B−Y) represents color difference signal between blue signal and luminance signal. In the mean time, the image sensor is not limited to the aforesaid CMOS type image sensor, and other ones such as CCD may also be used.

The substrate 52 which supports image sensor 51 is connected to image sensor 51 through wires so as to be able to communicate with image sensor 51.

The substrate 52 is connected to an external circuit (for example, a control circuit provided on an upper device of a mobile terminal on which an image pickup apparatus is mounted) through an unillustrated external connecting terminal, to make it possible to receive the supply of voltage for driving image sensor SR from an external circuit and of clock signal, and to output digital YUV signal to external circuits.

An upper portion of the image sensor 51 is sealed by flat plate PT such as an infrared blocking filter fixed on the upper surface of the substrate 52. On the circumference of the upper surface of the flat plate PT, there is fixed a bottom edge of spacer member SP2. On the upper edge of spacer member SP2, there is fixed a portion around second lens substrate LS2 (which is a surface of third resin portion PL3 or a surface of second lens substrate LS2 which will be described below) of second lens block BK2. Second resin portion PL2 formed on the upper surface of second lens substrate LS2 and first resin portion PL1 formed on the bottom surface of first lens substrate LS1 of first lens block BK1 are closely bonded together.

First lens block BK1 includes first lens substrate LS1 which is a parallel flat plate made of glass, first object-side lens portion L1a (lens portion 1a) which is fixed on the object-side surface of first lens substrate LS1 and made of resin, and a resin portion which includes first image-side lens portion L1b (first lens portion 1b), is fixed on the image-side surface of first lens substrate LS1 and is made of resin. Between first object-side lens portion L1a and first lens substrate LS1, there is formed an aperture stop S with a thin film which has a light-blocking effect and is laminated on the surface of first lens substrate LS1. Second lens block BK2 includes second lens substrate LS2 which is a parallel flat plate made of glass, a resin portion which includes second object-side lens portion L2a (lens portion 2a), is fixed on the object-side surface of second lens substrate LS2 and is made of resin, and second image-side lens portion L2b (first lens portion 2b) which is fixed on the image-side surface of second lens substrate LS2 and made of resin. A surface facing the substrate LS2 of the resin portion including image-side lens portion L1b and a surface facing the substrate LS1 of the resin portion including second object-side lens portion L2a are directory joined with adhesive A which is deposed on at least one of the surfaces of the resin portions. At that time, the adhesive is placed to surround lens portions L1b and L2a. Thereby, the lens portions L1b and L2a are sealed between the resin portions with the adhesive.

As described above, the image pickup lens has a structure which does not require a spacer member as a separated body for adjusting an interval between the surface facing substrate LS2 of the resin portion including first image-side lens portion L1b and the surface facing substrate LS1 of the resin portion including second object-side lens portion L2a. Therefore, the total length of the image pickup lens as an optical system can be much more decreased.

The object-side surface of first lens portion L1a is in a convex shape facing the object side, and the object-side surface of second lens portion L2a is in a concave shape facing the image side. These surfaces satisfy the following expressions.

$$0.6 < f1/f < 1.0 \quad (1)$$

$$0.00 < |n1a - n1s| < 0.06 \quad (2)$$

$$0.00 < |n1b - n1s| < 0.06 \quad (3)$$

$$0.00 \leq |n1a - n1b| < 0.05 \quad (4)$$

$$10 < v1a - v2a < 45 \quad (5)$$

In these expressions, f1 is a focal length of the first lens block (BK1) at d-line, f is a focal length of a total system of the image pickup lens at d-line, n1a is a refractive index of the lens portion 1a (L1a) at d-line, n1b is a refractive index of the lens portion 1b (L1b) at d-line, n1s is a refractive index of the first lens substrate (LS1), v1a is an Abbe number of the lens portion 1a (L1a), and v2a is an Abbe number of the lens portion 2a (L2a).

Herein, lens substrate LS2 may be a structure that lens portions are formed on both of the object-side surface and the image-side surface or a structure that a lens portion is formed on only the object-side surface. By forming lens portions at least on the object-side surface of the lens substrate LS2, the effect of the present invention is exhibited enough. The image pickup lens can include three or more lens blocks. In that case, all the lens substrates in the image pickup lens are preferably parallel flat plates in shape. Further, all the lens substrates are preferably formed of glass and all the lens portions lens are preferably formed of resin.

Additionally, a stop as a separated body can be arranged at the object side of lens portion 1a (L1a).

Operations of the aforesaid image pickup unit 50 will be explained. Each of FIGS. 3a and 3b shows how the image pickup unit 50 is installed in cell phone 100 as a mobile terminal or an image pickup apparatus. Further, FIG. 4 is a block diagram of the cell phone 100.

The image pickup apparatus 50 is provided, for example, so that the object-side end of the image pickup lens is disposed on the back surface of cell phone 100 (where the side of the liquid crystal display is assumed to be a front surface), to be placed at a lower position of the liquid crystal display.

External connecting terminal of the image pickup apparatus 50 is connected to the controller 101 of the cell phone 100, and the image signal such as the brightness signal or the color difference signal is outputted to the controller 101.

Figure 4:
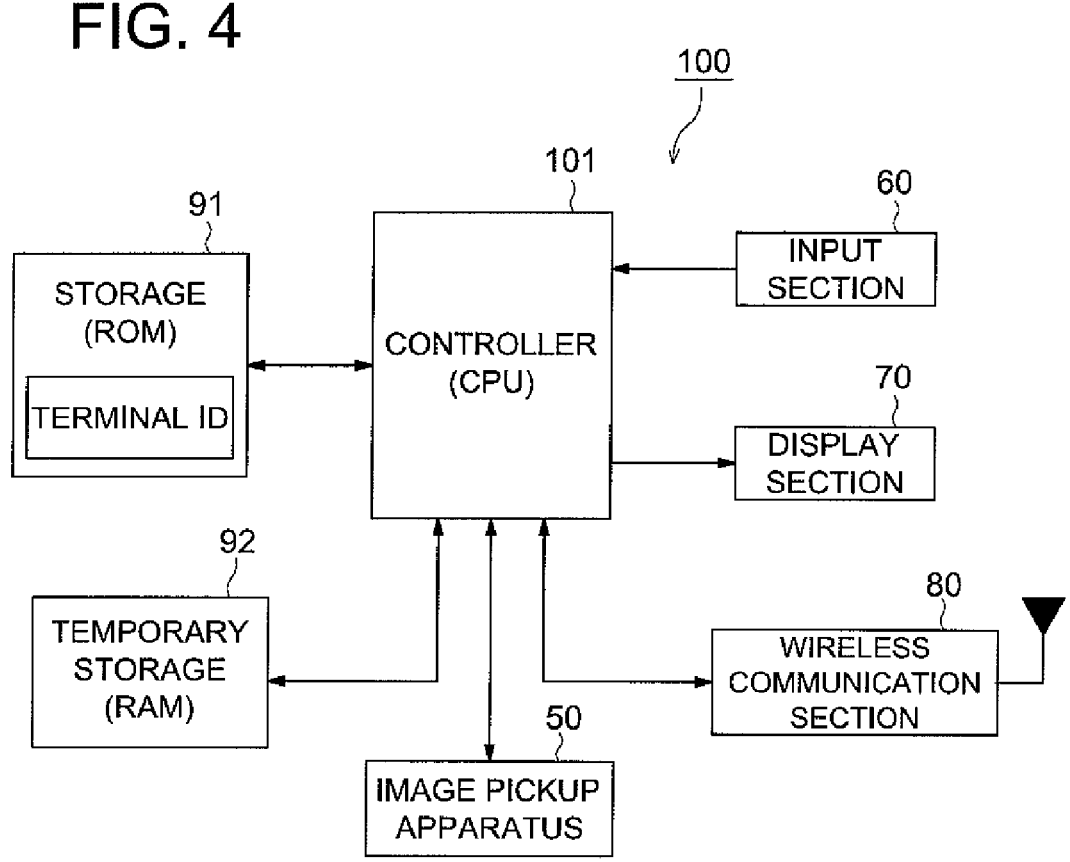
FIG. 4 is a control block diagram of cell phone 100.

On the one hand, as shown in FIG. 4, the cell phone 100 is provided with: controlle (CPU) 101 which generally controls each section and executes the program corresponding to each processing input section 60 which is an input section for indicating and inputting the number, display section 70 that displays images and movies which are taken, wireless communication section 80 for realizing an each kind of information communication to the external server, storage (ROM) 91 which stores the data necessary for the system program of the cell phone 100 or each kind of processing program or terminal ID, and a temporary storage (RAM) 92 which temporarily stores each kind of processing program or data to be processed by controller 101, processed data, image data from the image pickup apparatus 50, as a working area.

When a photographer holding cell phone 100 aims image pickup lens 10 of the image pickup apparatus 50 to a subject, image signal of a still image or movie is taken in image sensor 51. As the photographer presses button BT shown in FIG. 3a, the shutter is released and the image signal is took in image pickup apparatus 50. The image signal from inputted from the image pickup apparatus 50 is sent to a control system of the cell phone 100, to be stored in storage 91 or to be displayed on display section 70, or further to be transmitted to the outside as image information through wireless communication section 80.

A manufacturing method for image pickup lens of the present embodiment will be explained as follows. FIGS. 5a, 5b, and 5c are diagrams illustrating a process of manufacturing the image pickup lens relating to the present embodiment. First, lens block unit UT including plural lens blocks BK which are two-dimensionally arrayed as shown in a cross-sectional view in FIG. 5a, is manufactured. The Lens block unit UT is manufactured, for example, by a replica method that can manufacture many lenses simultaneously at low cost. Incidentally, the number of lens block BK included in lens block unit UT is at least two. Each lens block BK is not required to includes lens portions arranged on the opposing surfaces and each lens block BK can include a lens portion on one surface of the lens block.

In the replica method, curable resin is disposed at a space between lens substrate LS which is large in size and a parallel flat plate made of glass, and a mold including a plural molding surfaces having a negative shape of lens portions. Then, the molding surfaces of the mold is pressed relatively toward the lens substrate LS, to fill up the molding surfaces with the curable resin, and the curable resin is hardened. By the method, resin PL is formed thorough a transferring process into a shape of arrayed plural lenses at once. In other words, many resin lenses PL are manufactured simultaneously on lens substrate LS in this replica method.

Then, image pickup lens 10 is manufactured from the lens block units UT that are provided by the aforesaid methods. An example of the manufacturing process for the image pickup lens is shown on a schematic sectional diagram in FIG. 5b.

First lens block unit UT1 is composed of first lens substrate LS1 which is a parallel flat plate, plural first object-side lens portions L1a, and first resin portion PL1. The plural first object-side lens portions L1a are formed on one flat surface of the first lens substrate. The first resin portion PL1 is flat in shape (where the thickness is constant except to lens portions L1b), and is formed on the other flat surface of the first lens substrate. The first resin portion PL1 includes plural first image-side lens portions L1b formed on its surface. First object-side lens portions L1a are formed on first lens substrate LS1 by the above-described replica method through a thin film. The thin film has light-blocking property to form an aperture stop, and is arranged between the first object-side lens portions L1a and first lens substrate LS1. First image-side lens portions L1b are also formed on first lens substrate LS1 by the replica method. The optical axes of lens portions L1a and lens portions L1b coincide with each other with high accuracy. The lens portions L1a and L1b and the lens substrate LS1 can be formed by joining together with adhesive. The lens portion L1a can be formed on a surface of a flat resin portion, similarly to the lens portions L1b.

Second lens block unit UT2 is composed of second lens substrate LS2 which is a parallel flat plate, second resin portion PL2, and third resin portion PL3. The second resin portion PL2 is flat in shape (where the thickness is constant except to lens portions L2a), and is formed on one flat surface of the second lens substrate. The second resin portion PL2 includes plural second object-side lens portions L2a formed on its surface. The third resin portion PL3 is flat in shape (where the thickness is constant except to lens portions L2b), and is formed on the other flat surface of the second lens substrate. The third resin portion PL3 includes plural second image-side lens portions L2b formed on its surface. Second object-side lens portions L2a are formed on second lens substrate LS2 by the above-described replica method. First image-side lens portions L2b are also formed on second lens substrate LS2 by the replica method. The optical axes of lens portions L2a and lens portions L2b coincide with each other with high accuracy. The lens portions L2a and L2b and the lens substrate LS2 can be formed by joining together with adhesive. The lens portion L2a can be formed on the surface of a flat resin portion, similarly to the lens portions L2b.

Next, positions of first lens substrate LS1 and second lens substrate LS2 each including the above-described lens portions are adjusted. Concretely, first lens substrate LS1 and second lens substrate LS2 are arranged so that first resin portion PL1 including lens portions L1b formed on its surface and second resin portion PL2 including lens portions L2a formed on its surface face each other. Further, positions of first lens substrate LS1 and second lens substrate LS2 are adjusted so that optical axes of lens portions L1a, L1b, L2a, and L2b coincide with each other. As an example of a method to align the optical axes, there can be provided the following process. Position reference marks are put on first lens substrate LS1 and second lens substrate LS2, where the marks are observed as characteristic points with different brightness from the other area (for example, a protrusion which is formed by using a mold having a transfer surface on which a fine depression is formed and by performing a molding process to transfer the depression). The marks are optically observed to calculate the position of the characteristic points in the observing coordinate system. Then, the positions of the lens substrates are adjusted so that the positions of the characteristic points coincide with each other (See JP-A No. 2006-146043).

After that, the surfaces of first resin portion PL1 and second resin portion PL2 which face each other are joined with adhesive A as shown in FIG. 2. The adhesive is disposed so as to surround the corresponding lens portions L1b and L2a whose positions are adjusted when the surfaces are joined together. Therefore, the surfaces are joined with the lens portions L1b and L2a sealed between the resin portions. Such the structure does not cause a problem that offcut enters in lens when a cutting step described below to affect its optical property. Thus, first lens substrate LS1 and the second lens substrate LS2 are closely joined to be one body.

Then, the joined first lens substrate LS1 and second lens substrate LS2 are cut to form image pickup lenses each including a combination of first and second lens blocks. The cutting position Q is determined to a position where the adhesive sealing each of the lens portions L1b and L2a is formed, or a periphery of the position. Thereby, as shown in FIG. 5c, plural lens groups LG each of which has a two-element structure composed of the first and second lens blocks each of which is formed into one body, are formed efficiently. After that, the image pickup lens 10 and parallel flat plate PT are positioned to face imaging sensor 51 mounted to substrate 52, to be held by casing 20. Thereby, an image pickup apparatus shown in FIG. 2 is obtained.

As described above, the lens group LG of first and second lens blocks as a structural element of image pickup lens 10, is manufactured by cutting a member including plural lens blocks BK (first lens block BK1 and second lens block BK2). The structure simplifies an adjustment of interval of lenses in image pickup lens 10 and simplifies assembly of the lenses. Therefore, image pickup apparatuses which are expected to achieve a high image quality can be mass-produced.

When plural lens portions are formed on a substrate, the lens portions can be separately formed in arrayed manner. In the cutting step, the substrate can be cut by being guided by the array. Therefore, lens groups LG can be obtained by cutting a member including plural lens blocks BK easily, which saves manufacturing time and effort. As the result, lens groups LG can be mass-produced at low cost.

By manufacturing image pickup lenses 10 with the above manner, numbers of image pickup lenses can be manufactured simultaneously. To form the image pickup lens, it is enough that two lens blocks are joined, but three or more lens blocks can be joined.

In the above description, there is not arranged a spacer member as a separated body between the first lens block LB1 and the second lens block LB2, for adjusting an interval of the lens blocks LB1 and LB2. However, the present invention is not limited to the structure. There can be provided a structure that a spacer member B1 as a separated body is arranged between the first lens substrate LS1 and the second lens substrate LS2 as shown in FIGS. 26a to 26c. Also in this case, the number of lens blocks is not limited to two, and the image pickup lens can be composed of three or more lens blocks. Further, respective lens blocks can be formed of thermal curable resin or UV curable resin.

As shown in FIG. 26c, first substrate LS1, second substrate LS2 and spacer member B1 which are joined together can be cut to form image pickup lenses each including a combination of first and second lens blocks. Thereby, plural lens groups LG each of which has a two-element structure composed of the first and second lens blocks each of which is formed into one body, are formed efficiently. The cutting position Q is determined on spacer member B1.

Similarly to the image pickup lens, an image pickup apparatus including an image pickup element to be used can be manufactured by this wafer-scale method. In other words, the image-pickup-element substrate (substrate 52 in FIG. 2) including plural image pickup elements is prepared, and the image-pickup-element substrate is positioned so that the position of each image pickup element coincides with the first and second lens units which are jointed together. Then, the image-pickup-element substrate is joined to the first and second lens units. Then, the joined first and second lens unit and the image-pickup-element substrate are cut into pieces each including a combination of the first lens block, the second lens block, and the image pickup element. Thereby, numbers of image pickup apparatuses are manufactured simultaneously.

As an example, numbers of image pickup apparatuses can be manufactured simultaneously with the following steps. As shown in FIG. 26c, the image-pickup-element substrate including plural image pickup elements is prepared as substrate PT. The image-pickup-element substrate is positioned so that the first and second lens units UT1 and UT2 which are joined together as shown in FIG. 5b or 26b coincide with each image pickup element. The image-pickup-element substrate is joined to the first and second lens units through spacer member B2. Then, the joined first to third lens blocks are cut into pieces each including a combination of the first lens block, the second lens block, and the image pickup element.

Further, the image-pickup-element substrate including plural image pickup elements can be joined to three or more lens units which are previously joined together, after the positions of the image-pickup-element substrate and joined three or more lens units are adjusted.

It is natural that there is no need to previously join the first lens unit and second lens unit together. The positioning process can be performed individually in the first lens unit, the second lens unit, and the image-pickup-element substrate. Then, the first lens unit, the second lens unit, and the image-pickup-element substrate can be joined to each other and can be cut all together.

EXAMPLES

Examples suitable to the above embodiments will be shown below. However, the scope of the invention is not limited to the following examples. Symbols used in each of Examples are as follows:

f: focal length of the total system of the image pickup lens fB: back focus (which is a distance from the last lens-surface to the image plane measured when a parallel flat plate is converted into an air distance)

F: F number

2Y: Diagonal length of image pickup surface of solid-state image pickup element (Diagonal length on rectangular effective pixel area of solid-state image pickup element)

ENTP: Entrance pupil position (Distance from the first lens-surface to entrance pupil position)

EXTP: Emergence pupil position (Distance from the image plane to the emergence pupil position)

H1: Front side principal point position (Distance from the first lens-surface to front side principal point position)

H2: Rear side principal point position (Distance from the last lens-surface to rear side principal point position)

R: Curvature radius of refractive surface

D: Surface distance on the optical axis

Nd: Refractive index of lens material at normal temperature for d-line vd: Abbe number of lens material As for a focal length of the each lens portion, the focal length of a lens portion formed on the object or image side surface of the lens substrate is obtained under the condition that each lens portion is placed on the air.

The following Examples 1 to 10 show construction data tables 1-10. In the tables, F-number and half angle of view represent an effective value at a finite distance, namely an object distance shown in the tables. Further, back focus represents an effective value at the object distance, and is calculated under the assumption that a space of the parallel flat plate arranged between the surface at the closest position to the image and the focal position at the image side, is converted into an air distance. Further, TL represents a value calculated by adding the back focus to the distance from the lens surface at the closest position to the object to the lens surface at the closest position to the image.

In each Example, the shape of the aspheric surface is expressed by the following expression (12) in Cartesian coordinates, where X-axis extends along the optical axis direction, and the top of the surface is on the origin. In the expression, the height perpendicular to the optical axis is h, R represents a curvature radius, K represents a conic constant, and Ai represents $i^{th}$ order aspheric surface coefficient.

$$X = \frac{h^2/R}{1 + \sqrt{1 - (1+K)h^2/R^2}} + \sum A_i h^i \quad (12)$$

In the following description (including lens data in Tables), an exponent for 10 is assumed to be expressed by using E (for example, $2.5 \times 10^{-02}$ is expressed by 2.5E−02). Further, surface numbers in lens data are numbered by assuming the surface facing the object of the first lens as the first surface. Incidentally, each of all units of numerical values indicating lengths described in the Examples is mm.

Example 1

Lens data in Example 1 are shown in Table 1. FIG. 6 is a cross-sectional view of a lens in Example 1. FIGS. 7a to 7c are aberration diagrams of Example 1. FIG. 7a is spherical aberration, FIG. 7b is astigmatism, and FIG. 7c is distortion. In the spherical aberration diagram, a solid line represents an amount of spherical aberration at d-line and a dotted line represents an amount of spherical aberration at g-line. In the astigmatism diagram, a solid line represents a saggital surface and a dotted line represents a meridional surface. Diagrams in the following expression are represented in the same manner. The image pickup lens of Example 1 includes, in order from the object side, first lens block BK1 including lens portion 1a (L1a) being convex facing the object side, aperture stop S, first substrate LS1, and lens portion 1b (L1b) being concave facing the image side; second lens block BK2 including lens portion 2a (L2a) being concave facing the object side, second lens substrate LS2, and lens portion 2b (L2b); and parallel flat plate PT assuming an optical lowpass filter, infrared blocking filter, sealing glass of a solid-state image pickup element. The symbol IM represents an image pickup plane. All the surfaces of lens portions that touch the air have aspheric shape.

In Example I, the refractive index nI of the material forming the surface at the closest position to the image side at d-line is 1.569 which is the refractive index of the material forming lens block 2b (L2b) at d-line.

TABLE 1 f = 2.79 mm  fB = 0.55 mm  F = 2.88  2Y = 3.5 mm
ENTP = 0.26 mm  EXTP = −1.94 mm  H1 = −0.96 mm  H2 = −2.79 mm

| Surface No. | R(mm) | D(mm) | Nd | vd | Effective radius (mm) |
|---|---|---|---|---|---|
| 1* | 0.770 | 0.33 | 1.515 | 56.4 | 0.53 |
| 2(Stop) | ∞ | 0.30 | 1.520 | 62.0 | 0.44 |
| 3 | ∞ | 0.07 | 1.515 | 56.4 | 0.46 |
| 4* | 1.908 | 0.30 | | | 0.46 |
| 5* | −2.620 | 0.07 | 1.569 | 34.7 | 0.52 |
| 6 | ∞ | 1.02 | 1.520 | 62.0 | 0.65 |
| 7 | ∞ | 0.39 | 1.569 | 34.7 | 1.41 |
| 8* | 24.629 | 0.22 | | | 1.42 |
| 9 | ∞ | 0.50 | 1.507 | 63.4 | 1.68 |
| 10 | ∞ | | | | 1.82 |

Aspheric surface coefficient

| | | | |
|---|---|---|---|
| 1st surface | K = −0.62302E+00<br>A4 = 0.48940E−01<br>A6 = 0.32533E+01<br>A8 = −0.28727E+02<br>A10 = 0.14281E+03<br>A12 = −0.34850E+03<br>A14 = 0.34181E+03<br>A16 =<br>A18 =<br>A20 = | 5th surface | K = 0.52086E+01<br>A4 = −0.12015E+01<br>A6 = 0.10311E+02<br>A8 = −0.95679E+02<br>A10 = 0.46605E+03<br>A12 = −0.12393E+04<br>A14 = 0.12637E+04<br>A16 =<br>A18 =<br>A20 = |
| 4th surface | K = −0.24858E+00<br>A4 = 0.30053E+00<br>A6 = −0.11872E+01<br>A8 = 0.16377E+02<br>A10 = −0.34224E+02<br>A12 = −0.75121E+02<br>A14 = 0.54825E+03<br>A16 =<br>A18 =<br>A20 = | 8th surface | K = 0.50000E+02<br>A4 = −0.79958E−01<br>A6 = 0.19777E−01<br>A8 = −0.33745E−01<br>A10 = 0.15522E−01<br>A12 = −0.30347E−02<br>A14 = 0.00000E+00<br>A16 =<br>A18 =<br>A20 = |

Lens block data

| Lens block | Starting surface | End surface | Focal length (mm) |
|---|---|---|---|
| 1 | 1 | 4 | 2.07 |
| 2 | 5 | 8 | −4.06 |

Example 2

Lens data in Example 2 are shown in Table 2. FIG. 8 is a cross-sectional view of a lens in Example 2. FIGS. 9a to 9c are aberration diagrams of Example 2. FIG. 9a is spherical aberration, FIG. 9b is astigmatism, and FIG. 9c is distortion. The image pickup lens of Example 2 includes, in order from the object side, first lens block BK1 including lens portion 1a (L1a) being convex facing the object side, aperture stop S, first substrate LS1, and lens portion 1b (L1b) being concave facing the image side; second lens block BK2 including lens portion 2a (L2a) being concave facing the object side, second lens substrate LS2, and lens portion 2b (L2b); and parallel flat plate PT assuming an optical lowpass filter, infrared blocking filter, sealing glass of a solid-state image pickup element. The symbol IM represents an image pickup plane. All the surfaces of lens portions that touch the air have aspheric shape.

In Example 2, the refractive index n1 of the material forming the surface at the closest position to the image side at d-line is 1.572 which is the refractive index of the material forming lens block 2b (L2b) at d-line.

TABLE 2 f = 2.93 mm fB = 0.58 mm F = 2.8 2Y = 3.5 mm
ENTP = 0.29 mm EXTP = −2.02 mm H1 = −0.69 mm H2 = −2.75 mm

| Surface No. | R(mm) | D(mm) | Nd | vd | Effective radius (mm) |
|---|---|---|---|---|---|
| 1* | 0.856 | 0.37 | 1.514 | 56.5 | 0.58 |
| 2(Stop) | ∞ | 0.30 | 1.520 | 62.0 | 0.47 |
| 3 | ∞ | 0.07 | 1.514 | 56.5 | 0.49 |
| 4* | 1.696 | 0.55 | | | 0.51 |
| 5* | −6.017 | 0.15 | 1.572 | 34.9 | 0.78 |
| 6 | ∞ | 0.63 | 1.520 | 62.0 | 0.97 |
| 7 | ∞ | 0.50 | 1.572 | 34.9 | 1.43 |
| 8* | −59.403 | 0.13 | | | 1.46 |
| 9 | ∞ | 0.40 | 1.507 | 63.4 | 1.65 |
| 10 | ∞ | | | | 1.76 |

Aspheric surface coefficient

| | | | |
|---|---|---|---|
| $1^{st}$ surface | K = −0.83816E+00<br>A4 = 0.11751E+00<br>A6 = 0.69557E+00<br>A8 = −0.12471E+01<br>A10 = −0.53405E+00<br>A12 = 0.55536E+01<br>A14 = 0.00000E+00<br>A16 =<br>A18 =<br>A20 = | $5^{th}$ surface | K = −0.23934E+01<br>A4 = −0.26606E+00<br>A6 = 0.63877E−01<br>A8 = 0.16664E+00<br>A10 = −0.23350E+01<br>A12 = 0.32107E+01<br>A14 = 0.00000E+00<br>A16 =<br>A18 =<br>A20 = |
| $4^{th}$ surface | K = 0.47611E+01<br>A4 = 0.25292E+00<br>A6 = −0.42468E+00<br>A8 = 0.11091E+02<br>A10 = −0.73135E+02<br>A12 = 274.9076673<br>A14 = −364.1319921<br>A16 =<br>A18 =<br>A20 = | $8^{th}$ surface | K = 0.13800E+02<br>A4 = 0.47487E−02<br>A6 = −0.11606E+00<br>A8 = 0.79190E−01<br>A10 = −0.34134E−01<br>A12 = 0.005630221<br>A14 = 0.00000E+00<br>A16 =<br>A18 =<br>A20 = |

Lens block data

| Lens block | Starting surface | End surface | Focal length (mm) |
|---|---|---|---|
| 1 | 1 | 4 | 2.58 |
| 2 | 5 | 8 | −11.73 |

TABLE 3 f = 2.92 mm fB = 0.56 mm F = 2.8 2Y = 3.5 mm
ENTP = 0.3 mm EXTP = −1.99 mm H1 = −0.74 mm H2 = −2.76 mm

| Surface No. | R(mm) | D(mm) | Nd | vd | Effective radius (mm) |
|---|---|---|---|---|---|
| 1* | 0.872 | 0.38 | 1.510 | 54.0 | 0.57 |
| 2(Stop) | ∞ | 0.30 | 1.520 | 62.0 | 0.47 |
| 3 | ∞ | 0.07 | 1.517 | 57.0 | 0.47 |
| 4* | 2.161 | 0.45 | | | 0.49 |
| 5* | −4.132 | 0.27 | 1.572 | 40.0 | 0.62 |
| 6 | ∞ | 0.67 | 1.520 | 62.0 | 0.86 |
| 7 | ∞ | 0.55 | 1.510 | 54.0 | 1.29 |
| 8* | −317.882 | 0.13 | | | 1.43 |
| 9 | ∞ | 0.40 | 1.507 | 63.4 | 1.60 |
| 10 | ∞ | | | | 1.69 |

Aspheric surface coefficient

| | | | |
|---|---|---|---|
| $1^{st}$ surface | K = −0.78269E+00<br>A4 = 0.14190E+00<br>A6 = 0.22190E+00<br>A8 = −0.99995E−01<br>A10 = 0.11081E+01<br>A12 = −0.43249E+01<br>A14 = 0.80392E+01<br>A16 =<br>A18 =<br>A20 = | $5^{th}$ surface | K = 0.16655E+02<br>A4 = −0.24991E+00<br>A6 = −0.387866E+00<br>A8 = 0.87691E+00<br>A10 = −0.23194E+01<br>A12 = −0.17549E+01<br>A14 =<br>A16 =<br>A18 =<br>A20 = |
| $4^{th}$ surface | K = 0.39019E+01<br>A4 = 0.15806E+00<br>A6 = 0.24117E+00<br>A8 = 0.68131E+01<br>A10 = −0.65620E+02<br>A12 = 027464E+03<br>A14 = −0.36411E+03<br>A16 =<br>A18 =<br>A20 = | $8^{th}$ surface | K = −0.50000E+02<br>A4 = 0.25776E−02<br>A6 = −0.77903E−01<br>A8 = 0.54566E−01<br>A10 = −0.31161E−01<br>A12 = 0.90401E−02<br>A14 = −0.12991E−02<br>A16 =<br>A18 =<br>A20 = |

Lens block data

| Lens block | Starting surface | End surface | Focal length (mm) |
|---|---|---|---|
| 1 | 1 | 4 | 2.41 |
| 2 | 5 | 8 | −7.32 |

Example 3

Lens data in Example 3 are shown in Table 3. FIG. 10 is a cross-sectional view of a lens in Example 3. FIGS. 11a to 11c are aberration diagrams of Example 3. FIG. 11a is spherical aberration, FIG. 11b is astigmatism, and FIG. 11c is distortion. The image pickup lens of Example 3 includes, in order from the object side, first lens block BK1 including lens portion 1a (L1a) being convex facing the object side, aperture stop S, first substrate LS1, and lens portion 1b (L1b) being concave facing the image side; second lens block BK2 including lens portion 2a (L2a) being concave facing the object side, second lens substrate LS2, and lens portion 2b (L2b); and parallel flat plate PT assuming an optical lowpass filter, infrared blocking filter, sealing glass of a solid-state image pickup element. The symbol IM represents an image pickup plane. All the surfaces of lens portions that touch the air have aspheric shape.

In Example 3, the refractive index nI of the material forming the surface at the closest position to the image side at d-line is 1.510 which is the refractive index of the material fanning lens block 2b (L2b) at d-line.

Example 4

Lens data in Example 4 are shown in Table 4. FIG. 12 is a cross-sectional view of a lens in Example 4. FIGS. 13a to 13c are aberration diagrams of Example 4. FIG. 13a is spherical aberration, FIG. 13b is astigmatism, and FIG. 13c is distortion. The image pickup lens of Example 4 includes, in order from the object side, first lens block BK1 including lens portion 1a (L1a) being convex facing the object side, aperture stop S, first substrate LS1, and lens portion 1b (L1b) being concave facing the image side; second lens block BK2 including lens portion 2a (L2a) being concave facing the object side, second lens substrate LS2, and lens portion 2b (L2b); and parallel flat plate PT assuming an optical lowpass filter, infrared blocking filter, sealing glass of a solid-state image pickup element. The symbol IM represents an image pickup plane. All the surfaces of lens portions that touch the air have aspheric shape.

In Example 4, the refractive index nI of the material forming the surface at the closest position to the image side at d-line is 1.572 which is the refractive index of the material forming lens block 2b (L2b) at d-line.

TABLE 4 f = 2.87 mm fB = 0.62 mm F = 2.8 2Y = 3.5 mm
ENTP = 0.28 mm EXTP = −2.15 mm H1 = −0.33 mm H2 = −2.65 mm

| Surface No. | R(mm) | D(mm) | Nd | vd | Effective radius (mm) |
|---|---|---|---|---|---|
| 1* | 0.899 | 0.36 | 1.514 | 56.5 | 0.57 |
| 2(Stop) | ∞ | 0.30 | 1.520 | 62.0 | 0.46 |
| 3 | ∞ | 0.07 | 1.514 | 56.5 | 0.50 |
| 4* | 1.749 | 0.59 | | | 0.52 |
| 5* | −17.590 | 0.15 | 1.572 | 34.9 | 0.86 |
| 6 | ∞ | 0.71 | 1.520 | 62.0 | 1.00 |
| 7 | ∞ | 0.42 | 1.572 | 34.9 | 1.44 |
| 8* | −19.289 | 0.13 | | | 1.46 |
| 9 | ∞ | 0.40 | 1.507 | 63.4 | 1.62 |
| 10 | ∞ | | | | 1.75 |

Aspheric surface coefficient

| 1st surface | K = −0.93333E+00<br>A4 = 0.11089E+00<br>A6 = 0.72008E+00<br>A8 = −0.16881E+01<br>A10 = 0.86223E+00<br>A12 = 0.39518E+01<br>A14 = 0.00000E+00<br>A16 =<br>A18 =<br>A20 = | 5th surface | K = −0.38516E+02<br>A4 = −0.15138E+00<br>A6 = −0.12882E+00<br>A8 = 0.60400E+00<br>A10 = −0.13856E+01<br>A12 = 0.11187E+01<br>A14 = 0.00000E+00<br>A16 =<br>A18 =<br>A20 = |
|---|---|---|---|
| 4th surface | K = 4.954<br>A4 = 0.217<br>A6 = −0.501<br>A8 = 11.856<br>A10 = −81.182<br>A12 = 285.205<br>A14 = −364.114<br>A16 =<br>A18 =<br>A20 = | 8th surface | K = 0.14596E+01<br>A4 = 0.37056E−02<br>A6 = −0.10620E+00<br>A8 = 0.89064E−01<br>A10 = −0.39855E−01<br>A12 = 0.66349E−02<br>A14 = 0.00000E+00<br>A16 =<br>A18 =<br>A20 = |

Lens block data

| Lens block | Starting surface | End surface | Focal length (mm) |
|---|---|---|---|
| 1 | 1 | 4 | 2.77 |
| 2 | 5 | 8 | −490.54 |

TABLE 5 f = 2.74 fB = 0.55 mm F = 2.88 2Y = 3.5 mm
ENTP = 0.27 mm EXTP = −1.95 mm H1 = −0.85 mm H2 = −2.75 mm

| Surface No. | R(mm) | D(mm) | Nd | vd | Effective radius (mm) |
|---|---|---|---|---|---|
| 1* | 0.746 | 0.34 | 1.490 | 64.7 | 0.53 |
| 2(Stop) | ∞ | 0.30 | 1.471 | 65.2 | 0.43 |
| 3 | ∞ | 0.07 | 1.530 | 55.0 | 0.45 |
| 4* | 2.386 | 0.29 | | | 0.46 |
| 5* | −2.401 | 0.15 | 1.612 | 25.0 | 0.52 |
| 6 | ∞ | 0.84 | 1.520 | 62.0 | 0.72 |
| 7 | ∞ | 0.49 | 1.693 | 54.1 | 1.45 |
| 8* | 816.405 | 0.22 | | | 1.46 |
| 9 | ∞ | 0.50 | 1.507 | 63.4 | 2.00 |
| 10 | ∞ | | | | 2.00 |

Aspheric surface coefficient

| 1st surface | K = −0.93754E+00<br>A4 = 0.14695E+00<br>A6 = 0.31746E+01<br>A8 = −0.28003E+02<br>A10 = 0.14261E+03<br>A12 = −0.35141E+03<br>A14 = 0.34431E+03<br>A16 =<br>A18 =<br>A20 = | 5th surface | K = −0.12465E+02<br>A4 = −0.10680E+01<br>A6 = 0.86527E+01<br>A8 = −0.97193E+02<br>A10 = 0.53473E+03<br>A12 = −0.15366E+04<br>A14 = 0.16796E+04<br>A16 =<br>A18 =<br>A20 = |
|---|---|---|---|
| 4th surface | K = 0.15294E+01<br>A4 = 0.56670E+00<br>A6 = −0.87611E+01<br>A8 = 0.12120E+03<br>A10 = −0.79653E+03<br>A12 = 0.26365E+04<br>A14 = −0.31762E+04<br>A16 =<br>A18 =<br>A20 = | 8th surface | K = −0.50000E+02<br>A4 = −0.61467E−01<br>A6 = 0.22594E−01<br>A8 = −0.34464E−01<br>A10 = 0.13813E−01<br>A12 = −0.20902E−02<br>A14 =<br>A16 =<br>A18 =<br>A20 = |

Lens block data

| Lens block | Starting surface | End surface | Focal length (mm) |
|---|---|---|---|
| 1 | 1 | 4 | 1.98 |
| 2 | 5 | 8 | −3.91 |

Example 5

Lens data in Example 5 are shown in Table 5. FIG. 14 is a cross-sectional view of a lens in Example 5. FIGS. 15a to 15c are aberration diagrams of Example 5. FIG. 15a is spherical aberration, FIG. 15b is astigmatism, and FIG. 15c is distortion. The image pickup lens of Example 5 includes, in order from the object side, first lens block BK1 including lens portion 1a (L1a) being convex facing the object side, aperture stop S, first substrate LS1, and lens portion 1b (L1b) being concave facing the image side; second lens block BK2 including lens portion 2a (L2a) being concave facing the object side, second lens substrate LS2, and lens portion 2b (L2b); and parallel flat plate PT assuming an optical lowpass filter, infrared blocking filter, sealing glass of a solid-state image pickup element. The symbol IM represents an image pickup plane. All the surfaces of lens portions that touch the air have aspheric shape.

In Example 5, the refractive index nI of the material forming the surface at the closest position to the image side at d-line is 1.693 which is the refractive index of the material forming lens block 2b (L2b) at d-line.

Example 6

Lens data in Example 6 are shown in Table 6. FIG. 16 is a cross-sectional view of a lens in Example 6. FIGS. 17a to 17c are aberration diagrams of Example 6. FIG. 17a is spherical aberration, FIG. 17b is astigmatism, and FIG. 17c is distortion. The image pickup lens of Example 6 includes, in order from the object side, first lens block BK1 including lens portion 1a (L1a) being convex facing the object side, aperture stop S, first substrate LS1, and lens portion 1b (L1b) being concave facing the image side; second lens block BK2 including lens portion 2a (L2a) being concave facing the object side, second lens substrate LS2, and lens portion 2b (L2b); and parallel flat plate PT assuming an optical lowpass filter, infrared blocking filter, sealing glass of a solid-state image pickup element. The symbol IM represents an image pickup plane. All the surfaces of lens portions that touch the air have aspheric shape.

In Example 6, the refractive index nI of the material forming the surface at the closest position to the image side at d-line is 1.571 which is the refractive index of the material forming lens block 2b (L2b) at d-line.

TABLE 6 f = 2.64 fB = 0.39 mm F = 2.88 2Y = 3.5 mm
ENTP = 0.27 mm EXTP = −1.81 mm H1 = −1.03 mm H2 = −2.68 mm

| Surface No. | R(mm) | D(mm) | Nd | νd | Effective radius (mm) |
|---|---|---|---|---|---|
| 1* | 0.915 | 0.35 | 1.514 | 56.5 | 0.54 |
| 2(Stop) | ∞ | 0.30 | 1.520 | 62.0 | 0.42 |
| 3 | ∞ | 0.17 | 1.514 | 56.5 | 0.46 |
| 4* | 3.087 | 0.31 | | | 0.49 |
| 5* | −6.096 | 0.20 | 1.571 | 34.9 | 0.58 |
| 6 | ∞ | 1.10 | 1.520 | 62.0 | 0.75 |
| 7 | ∞ | 0.30 | 1.571 | 34.9 | 1.50 |
| 8* | 5.576 | 0.09 | | | 1.53 |
| 9 | ∞ | 0.50 | 1.507 | 63.4 | 1.67 |
| 10 | ∞ | | | | 1.83 |

Aspheric surface coefficient $1^{st}$ surface
K = −0.64560E+00
A4 = −0.15220E+00
A6 = 0.42703E+01
A8 = −0.34077E+02
A10 = 0.15134E+03
A12 = −0.34871E+03
A14 = 0.32787E+03
A16 =
A18 =
A20 =

$5^{th}$ surface
K = 0.28141E+02
A4 = −0.69873E+00
A6 = 0.47225E+01
A8 = −0.40103E+02
A10 = 0.176433E+03
A12 = −0.41065E+03
A14 = 0.37195E+03
A16 =
A18 =
A20 =

$4^{th}$ surface
K = −0.59190E+01
A4 = 0.39272E+00
A6 = −0.54657E+01
A8 = 0.46511E+02
A10 = −0.14653E+03
A12 = 0.19260E+02
A14 = 0.51393E+03
A16 =
A18 =
A20 =

$8^{th}$ surface
K = −0.30000E+02
A4 = −0.41539E−02
A6 = −0.34432E−02
A8 = −0.49522E−01
A10 = 0.26827E−01
A12 = −0.44354E−02
A14 =
A16 =
A18 =
A20 =

Lens block data

| Lens block | Starting surface | End surface | Focal length (mm) |
|---|---|---|---|
| 1 | 1 | 4 | 2.24 |
| 2 | 5 | 8 | −4.85 |

TABLE 7 f = 2.54 fB = 0.38 mm F = 2.88 2Y = 3.5 mm
ENTP = 0.26 mm EXTP = −1.79 mm H1 = −0.9 mm H2 = −2.59 mm

| Surface No. | R(mm) | D(mm) | Nd | νd | Effective radius (mm) |
|---|---|---|---|---|---|
| 1* | 0.932 | 0.35 | 1.514 | 56.5 | 0.53 |
| 2(Stop) | ∞ | 0.40 | 1.520 | 62.0 | 0.40 |
| 3 | ∞ | 0.07 | 1.514 | 56.5 | 0.47 |
| 4* | 3.829 | 0.27 | | | 0.49 |
| 5* | −6.783 | 0.21 | 1.571 | 34.9 | 0.55 |
| 6 | ∞ | 1.10 | 1.520 | 62.0 | 0.72 |
| 7 | ∞ | 0.30 | 1.571 | 34.9 | 1.49 |
| 8* | 5.538 | 0.10 | | | 1.52 |
| 9 | ∞ | 0.50 | 1.507 | 63.4 | 1.67 |
| 10 | ∞ | | | | 1.85 |

Aspheric surface coefficient $1^{st}$ surface
K = −0.59157E+00
A4 = −0.20813E+00
A6 = 0.50024E+01
A8 = −0.43352E+02
A10 = 0.21352E+03
A12 = −0.55557E+03
A14 = 0.59112E+03
A16 =
A18 =
A20 =

$5^{th}$ surface
K = −0.26623E+02
A4 = −0.75482E+00
A6 = 0.43037E+01
A8 = −0.41606E+02
A10 = 0.21062E+03
A12 = −0.57411E+03
A14 = 0.58406E+03
A16 =
A18 =
A20 =

$4^{th}$ surface
K = −0.10621E+01
A4 = 0.35505E+00
A6 = −0.68457E+01
A8 = 0.54226E+02
A10 = −0.15241E+03
A12 = −115.1836049
A14 = 860.0178172
A16 =
A18 =
A20 =

$8^{th}$ surface
K = 0.62791E+01
A4 = −0.33335E−01
A6 = 0.15084E−01
A8 = −0.65061E−01
A10 = 0.32347E−01
A12 = −0.005190423
A14 = 0.00000E+00
A16 =
A18 =
A20 =

Lens block data

| Lens block | Starting surface | End surface | Focal length (mm) |
|---|---|---|---|
| 1 | 1 | 4 | 2.19 |
| 2 | 5 | 8 | −5.09 |

Example 7

Lens data in Example 7 are shown in Table 7. FIG. 18 is a cross-sectional view of a lens in Example 7. FIGS. 19a to 19c are aberration diagrams of Example 7. FIG. 19a is spherical aberration, FIG. 19b is astigmatism, and FIG. 19c is distortion. In The image pickup lens of Example 7 includes, in order from the object side, first lens block BK1 including lens portion 1a (L1a) being convex facing the object side, aperture stop S, first substrate LS1, and lens portion 1b (L1b) being concave facing the image side; second lens block BK2 including lens portion 2a (L2a) being concave facing the object side, second lens substrate LS2, and lens portion 2b (L2b); and parallel flat plate PT assuming an optical lowpass filter, infrared blocking filter, sealing glass of a solid-state image pickup element. The symbol IM represents an image pickup plane. All the surfaces of lens portions that touch the air have aspheric shape.

In Example 7, the refractive index nI of the material forming the surface at the closest position to the image side at d-line is 1.571 which is the refractive index of the material forming lens block 2b (L2b) at d-line.

Example 8

Lens data in Example 8 are shown in Table 8. FIG. 20 is a cross-sectional view of a lens in Example 8. FIGS. 21a to 21c are aberration diagrams of Example 8. FIG. 21a is spherical aberration, FIG. 21b is astigmatism, and FIG. 21c is distortion. The image pickup lens of Example 8 includes, in order from the object side, first lens block BK1 including lens portion 1a (L1a) being convex facing the object side, aperture stop S, first substrate LS1, and lens portion 1b (L1b) being concave facing the image side; second lens block BK2 including lens portion 2a (L2a) being concave facing the object side, second lens substrate LS2, and lens portion 2b (L2b); third lens block BK3 including lens portion 3a (L3a) being concave facing the object side, third lens substrate LS3, and lens portion 3b (L3b); and parallel flat plate PT assuming an optical lowpass filter, infrared blocking filter, sealing glass of a solid-state image pickup element. The symbol IM represents an image pickup plane. All the surfaces of lens portions that touch the air have aspheric shape.

In Example 8, the refractive index nI of the material forming the surface at the closest position to the image side at d-line is 1.514 which is the refractive index of the material forming lens block 3b (L3b) at d-line.

TABLE 8 f = 2.73 fB = 0.62 mm F = 2.8 2Y = 3.5 mm
ENTP = 0.17 mm EXTP = −1.84 mm H1 = −0.98 mm H2 = −2.65 mm

| Surface No. | R(mm) | D(mm) | Nd | νd | Effective radius (mm) |
|---|---|---|---|---|---|
| 1* | 0.823 | 0.23 | 1.514 | 56.5 | 0.51 |
| 2(Stop) | ∞ | 0.30 | 1.520 | 62.0 | 0.47 |
| 3 | ∞ | 0.05 | 1.514 | 56.5 | 0.48 |
| 4* | 2.063 | 0.38 | | | 0.49 |
| 5* | −2.024 | 0.05 | 1.572 | 34.9 | 0.54 |
| 6 | ∞ | 0.30 | 1.520 | 62.0 | 0.69 |
| 7 | ∞ | 0.29 | 1.514 | 56.5 | 0.93 |
| 8* | −12.054 | 0.19 | | | 0.97 |
| 9* | 1.338 | 0.23 | 1.514 | 56.5 | 1.32 |
| 10 | ∞ | 0.30 | 1.520 | 62.0 | 1.41 |
| 11 | ∞ | 0.15 | 1.514 | 56.5 | 1.54 |
| 12* | 1.365 | 0.28 | | | 1.56 |
| 13 | ∞ | 0.40 | 1.516 | 64.1 | 1.70 |
| 14 | ∞ | | | | 1.81 |

Aspheric surface coefficient

| 1st surface | K = 0.35625E+00<br>A4 = −0.86853E−01<br>A6 = 0.41005E+00<br>A8 = −0.240392E+01<br>A10 = 0.26359E+01<br>A12 = 0.00000E+00<br>A14 = 0.00000E+00<br>A16 =<br>A18 =<br>A20 = | 8th surface | K = 0.30000E+02<br>A4 = −0.46442E+00<br>A6 = 0.33943E+00<br>A8 = 0.88520E−02<br>A10 = −0.10168E+00<br>A12 = −0.14545E−01<br>A14 = 0.00000E+00<br>A16 =<br>A18 =<br>A20 = |
|---|---|---|---|
| 4th surface | K = 0.11833E+02<br>A4 = 0.12197E+00<br>A6 = −0.66520611<br>A8 = 2.822877666<br>A10 = −3.34296604<br>A12 = 0.00000E+00<br>A14 = 0.00000E+00<br>A16 =<br>A18 =<br>A20 = | 9th surface | K = 0.76416E+00<br>A4 = −0.61068E+00<br>A6 = 0.332220193<br>A8 = −0.00983371<br>A10 = −0.05323971<br>A12 = 0.013869485<br>A14 = 0.00000E+00<br>A16 =<br>A18 =<br>A20 = |
| 5th surface | K = 12.448<br>A4 = −0.12462835<br>A6 = −0.1762311<br>A8 = −2.90183237<br>A10 = 17.19602577<br>A12 = −36.824644<br>A14 = 0.00000E+00<br>A16 =<br>A18 =<br>A20 = | 12th surface | K = −3.32018269<br>A4 = −0.22443565<br>A6 = 0.083301386<br>A8 = −0.03366611<br>A10 = 0.009106286<br>A12 = −0.00077973<br>A14 = 0.00000E+00<br>A16 =<br>A18 =<br>A20 = |

Lens block data

| Lens block | Starting surface | End surface | Focal length (mm) |
|---|---|---|---|
| 1 | 1 | 4 | 2.29 |
| 2 | 5 | 8 | −4.23 |
| 3 | 9 | 12 | 13.71 |

Example 9

Lens data in Example 9 are shown in Table 9. FIG. 22 is a cross-sectional view of a lens in Example 9. FIGS. 23a to 23c are aberration diagrams of Example 9. FIG. 23a is spherical aberration, FIG. 23b is astigmatism, and FIG. 23c is distortion. The image pickup lens of Example 9 includes, in order from the object side, first lens block BK1 including lens portion 1a (L1a) being convex facing the object side, aperture stop S, first substrate LS1, and lens portion 1b (L1b) being concave facing the image side; second lens block BK2 including lens portion 2a (L2a) being concave facing the object side, second lens substrate LS2, and lens portion 2b (L2b); third lens block BK3 including lens portion 3a (L3a) being concave facing the object side, third lens substrate LS3, and lens portion 3b (L3b); and parallel flat plate PT assuming an optical lowpass filter, infrared blocking filter, sealing glass of a solid-state image pickup element. The symbol IM represents an image pickup plane. All the surfaces of lens portions that touch the air have aspheric shape.

In Example 9 the refractive index nI of the material forming the surface at the closest position to the image side at d-line is 1.514 which is the refractive index of the material forming lens block 3b (L3b) at d-line.

TABLE 9 f = 2.8 fB = 0.63 mm F = 2.8 2Y = 3.5 mm
ENTP = 0.18 mm EXTP = −1.86 mm H1 = −1.05 mm H2 = −2.72 mm

| Surface No. | R(mm) | D(mm) | Nd | νd | Effective radius (mm) |
|---|---|---|---|---|---|
| 1* | 0.843 | 0.24 | 1.514 | 56.5 | 0.52 |
| 2(Stop) | ∞ | 0.30 | 1.474 | 56.4 | 0.48 |
| 3 | ∞ | 0.05 | 1.514 | 56.5 | 0.50 |
| 4* | 2.140 | 0.37 | | | 0.50 |
| 5* | −2.114 | 0.06 | 1.572 | 34.9 | 0.54 |
| 6 | ∞ | 0.30 | 1.474 | 56.4 | 0.69 |
| 7 | ∞ | 0.30 | 1.514 | 56.5 | 0.94 |
| 8* | −8.812 | 0.20 | | | 0.97 |
| 9* | 1.471 | 0.21 | 1.514 | 56.5 | 1.32 |
| 10 | ∞ | 0.30 | 1.474 | 56.4 | 1.44 |
| 11 | ∞ | 0.16 | 1.514 | 56.5 | 1.59 |
| 12* | 1.388 | 0.36 | | | 1.62 |
| 13 | ∞ | 0.30 | 1.516 | 64.1 | 1.77 |
| 14 | ∞ | | | | 1.83 |

Aspheric surface coefficient

| 1st surface | K = 0.30406E+00<br>A4 = −0.84569E−01<br>A6 = 0.40588E+00<br>A8 = −0.19398E+01<br>A10 = 0.25074E+01<br>A12 = 0.00000E+00<br>A14 = 0.00000E+00<br>A16 =<br>A18 =<br>A20 = | 8th surface | K = 0.28937E+02<br>A4 = −0.45045E+00<br>A6 = 0.33703E+00<br>A8 = −022444E−01<br>A10 = −0.10972E+0<br>A12 = 0.37990E−01<br>A14 = 0.00000E+00<br>A16 =<br>A18 =<br>A20 = |
|---|---|---|---|
| 4th surface | K = 0.91792E+01<br>A4 = 0.11528E+00<br>A6 = −0.80149E+00<br>A8 = 0.40185E+01<br>A10 = −0.71954E+01<br>A12 = 0.00000E+00<br>A14 = 0.00000E+00<br>A16 =<br>A18 =<br>A20 = | 9th surface | K = −0.82721E+00<br>A4 = −0.61417E+00<br>A6 = 0.33372E+00<br>A8 = −0.60192E−02<br>A10 = −0.52984E−01<br>A12 = 0.13218E−01<br>A14 = 0.00000E+00<br>A16 =<br>A18 =<br>A20 = |
| 5th surface | K = 13.820<br>A4 = −0.082<br>A6 = −0.807<br>A8 = −0.850<br>A10 = 16.175<br>A12 = −44.964<br>A14 = 0.00000E+00<br>A16 =<br>A18 =<br>A20 = | 12th surface | K = −2.86813768<br>A4 = −0.21863024<br>A6 = 0.085615037<br>A8 = −0.03295336<br>A10 = 0.009066945<br>A12 = −0.00115592<br>A14 = 0.00000E+00<br>A16 =<br>A18 =<br>A20 = |

Lens block data

| Lens block | Starting surface | End surface | Focal length (mm) |
|---|---|---|---|
| 1 | 1 | 4 | 2.33 |
| 2 | 5 | 8 | −4.84 |
| 3 | 9 | 12 | 26.71 |

Example 10

Lens data in Example 10 are shown in Table 10. FIG. 24 is a cross-sectional view of a lens in Example 10. FIGS. 25a to 25c are aberration diagrams of Example 10. FIG. 25a is spherical aberration, FIG. 25b is astigmatism, and FIG. 25c is distortion. The image pickup lens of Example 10 includes, in order from the object side, fast lens block BK1 including lens portion 1a (L1a) being convex facing the object side, aperture stop S, first substrate LS1, and lens portion 1b (L1b) being concave facing the image side; second lens block BK2 including lens portion 2a (L2a) being concave facing the object side, second lens substrate LS2, and lens portion 2b (L2b); and parallel flat plate PT assuming an optical lowpass filter, infrared blocking filter, sealing glass of a solid-state image pickup element. The symbol IM represents an image pickup plane. All the surfaces of lens portions that touch the air have aspheric shape.

In Example 10, the refractive index nI of the material forming the surface at the closest position to the image side at d-line is 1.646 which is the refractive index of the material forming lens block 2b (L2b) at d-line.

TABLE 10 f = 2.69 fB = 0.48 mm F = 2.8 2Y = 3.5 mm
ENTP = 0.24 mm EXTP = −1.90 mm H1 = −0.83 mm H2 = −2.66 mm

| Surface No. | R(mm) | D(mm) | Nd | νd | Effective radius (mm) |
|---|---|---|---|---|---|
| 1* | 0.769 | 0.31 | 1.532 | 55.0 | 0.51 |
| 2(Stop) | ∞ | 0.30 | 1.520 | 62.0 | 0.43 |
| 3 | ∞ | 0.07 | 1.490 | 67.2 | 0.45 |
| 4* | 1.802 | 0.23 | | | 0.46 |
| 5* | −2.712 | 0.11 | 1.612 | 25.0 | 0.49 |
| 6 | ∞ | 1.10 | 1.520 | 62.0 | 0.63 |
| 7 | ∞ | 0.48 | 1.646 | 55.2 | 1.51 |
| 8* | 47.798 | 0.10 | | | 1.52 |
| 9* | ∞ | 0.50 | 1.507 | 63.4 | 2.00 |
| 10 | ∞ | | | | |

Aspheric surface coefficient

| 1st surface | K = −0.89773E+00<br>A4 = 0.16229E+00<br>A6 = 027277E+01<br>A8 = −0.26880E+02<br>A10 = −0.15608E+03<br>A12 = −0.43612E+03<br>A14 = 0.47623E+03<br>A16 =<br>A18 =<br>A20 = | 5th surface | K = 0.42151E+01<br>A4 = −0.95613E+00<br>A6 = 0.76994E+01<br>A8 = −0.85156E+02<br>A10 = 0.47119E+03<br>A12 = −0.14522E+04<br>A14 = 0.16795E+04<br>A16 =<br>A18 =<br>A20 = |
|---|---|---|---|
| 4th surface | K = −0.42196E+01<br>A4 = 0.44301E+00<br>A6 = −0.49780E+01<br>A8 = 0.92458E+02<br>A10 = −0.69769E+03<br>A12 = 025262E+04<br>A14 = −0.31764E+04<br>A16 =<br>A18 =<br>A20 = | 8th surface | K = 0.50000E+02<br>A4 = −0.89677E−01<br>A6 = 0.75624E−01<br>A8 = −0.64133E−01<br>A10 = 0.21986E−01<br>A12 = −0.30087E−02<br>A14 = 0.00000E+00<br>A16 =<br>A18 =<br>A20 = |

Lens block data

| Lens block | Starting surface | End surface | Focal length (mm) |
|---|---|---|---|
| 1 | 1 | 4 | 1.98 |
| 2 | 5 | 8 | −4.12 |

Values of Examples corresponding to respective conditional expressions are shown collectively in Table 11.

TABLE 11

| Conditional Expression | | Example 1 | Example 2 | Example 3 | Example 4 | Example 5 | Example 6 |
|---|---|---|---|---|---|---|---|
| (1) | f1/f | 0.74 | 0.88 | 0.826 | 0.97 | 0.727 | 0.85 |
| (2) | \|n1a−ns\| | 0.005 | 0.006 | 0.010 | 0.006 | 0.019 | 0.006 |
| (3) | \|n1b−ns\| | 0.005 | 0.006 | 0.003 | 0.006 | 0.059 | 0.006 |
| (4) | \|n1a−n1b\| | 0.000 | 0.000 | 0.007 | 0.000 | 0.040 | 0.000 |
| (5) | ν1a−ν2a | 21.7 | 21.7 | 14.0 | 21.7 | 39.7 | 21.7 |
| (6) | ν1a | 56.4 | 56.5 | 54.0 | 56.5 | 64.7 | 56.5 |
| (7) | n1b | 1.515 | 1.514 | 1.517 | 1.514 | 1.530 | 1.514 |
| (8) | ν2a | 34.7 | 34.9 | 40.0 | 34.9 | 25.0 | 34.9 |
| (9) | f1b/f1a | 0.805 | 0.314 | 0.579 | 0.111 | 1.147 | 0.563 |
| (10) | nI | 1.569 | 1.572 | 1.510 | 1.572 | 1.693 | 1.571 |

| Conditional Expression | | Example 7 | Example 8 | Example 9 | Example 10 |
|---|---|---|---|---|---|
| (1) | f1/f | 0.86 | 0.84 | 0.84 | 0.74 |
| (2) | \|n1a−ns\| | 0.006 | 0.006 | 0.040 | 0.012 |
| (3) | \|n1b−ns\| | 0.006 | 0.006 | 0.040 | 0.030 |
| (4) | \|n1a−n1b\| | 0.000 | 0.000 | 0.000 | 0.042 |
| (5) | ν1a−ν2a | 21.7 | 21.7 | 21.7 | 30.0 |
| (6) | ν1a | 56.5 | 56.5 | 56.5 | 55.0 |
| (7) | n1b | 1.514 | 1.514 | 1.514 | 1.490 |
| (8) | ν2a | 34.9 | 34.9 | 34.9 | 25.0 |
| (9) | f1b/f1a | 0.628 | 1.135 | 1.127 | 0.830 |
| (10) | nI | 1.571 | 1.514 | 1.514 | 1.646 |

According to the above embodiments, an image pickup lens suitable for mass production and downsizing, an image pickup apparatus employing the image pickup lens, and a mobile terminal. The mobile terminal is not limited to a cell phone.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An image pickup lens comprising, in order from an object side thereof:
    a first lens block with a positive power, comprising
        a first lens substrate being a parallel flat plate,
        a lens portion 1a with a positive power, formed on an object-side surface of the first lens substrate, an object-side surface of the lens portion 1a being a convex surface facing the object side, and
        a lens portion 1b with a negative power, formed on an image-side surface of the first lens substrate, an image-side surface of the lens portion 1b being a concave surface facing an image side; and
    a second lens block comprising
        a second lens substrate being a parallel flat plate, and
        a lens portion 2a with a negative power, formed on an object-side surface of the second lens substrate, an object-side surface of the lens portion 2a being a concave surface facing the object side,
    wherein the image pickup lens satisfies the following expressions:

$0.6 < f1/f < 1.0,$ $0.00 < |n1a - n1s| < 0.06,$ $0.00 < |n1b - n1s| < 0.06,$ $0.00 \leq |n1a - n1b| < 0.05,$ and $10 < v1a - v2a < 45,$ where f1 is a focal length of the first lens block at d-line,
    f is a focal length of a total system of the image pickup lens at d-line,
    n1a is a refractive index of the lens portion 1a at d-line,
    n1b is a refractive index of the lens portion 1b at d-line,
    n1s is a refractive index of the first lens substrate,
    v1a is an Abbe number of the lens portion 1a, and
    v2a is an Abbe number of the lens portion 2a.

2. The image pickup lens of claim 1,
    wherein the image pickup lens satisfies the following expression:

$50 < v1a < 70.$

3. The image pickup lens of claim 1,
    wherein the image pickup lens satisfies the following expression:

$1.45 < n1b < 1.53.$

4. The image pickup lens of claim 1,
    wherein the image pickup lens satisfies the following expression:

$20 < v2a < 50.$

5. The image pickup lens of claim 1,
    wherein the image pickup lens satisfies the following expression:

$0.0 < f1b/f2a < 1.0,$ where f1b is a focal length of the lens portion 1b at d-line, measured when the lens portion 1b is arranged in an air, and
    f2a is a focal length of the lens portion 2a at d-line, measured when the lens portion 2a is arranged in an air.

6. The image pickup lens of claim 1,
    wherein the lens portion 1a and the lens portion 1b are formed of a same resin material.

7. The image pickup lens of claim 1,
    wherein a surface arranged at a closest position to the image side in the image pickup lens, has an aspheric shape which is convex or concave facing the image side around an optical axis and is convex facing the image side at a peripheral portion where a principal ray corresponding to a maximum image height passes through the surface.

8. The image pickup lens of claim 7,
    wherein a material forming the surface arranged at the closest position to the image side satisfies the following expression:

$1.53 < nI < 1.70,$ where nI is a refractive index at d-line of the material forming the surface arranged at the closest position to the image side.

9. The image pickup lens of claim 1,
    wherein each of the first lens substrate and the second lens substrate is formed of a glass material.

10. The image pickup lens of claim 1,
    wherein each of the lens portions 1a, 1b, and 2a is formed of a resin material.

11. The image pickup lens of claim 10,
    wherein the resin material includes a curable resin material.

12. The image pickup lens of claim 10,
    wherein inorganic microparticles which are 30 nm or less in size are dispersed in the resin material.

13. The image pickup lens of claim 10, further comprising
    a first resin portion arranged on the image-side surface of the first lens substrate, and
    a second resin portion arranged on the object-side surface of the second lens substrate,
    wherein a surface of the first resin portion includes the lens portion 1b,
    a surface of the second resin portion includes the lens portion 2a, and
    the surface of the first resin portion including the lens portion 1b and the surface of the second resin portion including the lens portion 2a are joined together with an adhesive.

14. An image pickup apparatus comprising the image pickup lens of claim 1.

15. A mobile terminal comprising the image pickup apparatus of claim 14.

16. A method for manufacturing the image pickup lens of claim 1, comprising:
    preparing the first lens substrate and the second lens substrate, wherein the first lens substrate includes a plurality of the lens portions 1a formed on one surface of the first lens substrate and a plurality of the lens portions 1b formed on the other surface of the first lens substrate such that optical axes of the lens portions 1a coincide with optical axes of the corresponding lens portions 1b, and the second lens substrate includes a plurality of the lens portions 2a formed on one surface of the second lens substrate;

arranging the first lens substrate and the second lens substrate such that the plurality of lens portions 1b and the plurality of lens portions 2a face each other, and adjusting positions of the first lens substrate and the second lens substrate;

joining the first lens substrate and the second lens substrate together after adjusting positions of the first lens substrate and the second lens substrate; and cutting the first lens substrate and the second lens substrate which are joined together, to form image pickup lenses each comprising a combination of the first lens block and the second lens block.

17. The method of claim 16, wherein the first lens substrate and the second lens substrate are joined together through a spacer member with an adhesive after adjusting positions of the first lens substrate and the second lens substrate, and the first lens substrate, the second lens substrate and the spacer member which are joined together, are cut to form image pickup lenses each comprising a combination of the first lens block and the second lens block.

18. A method for manufacturing the image pickup lens of claim 13, comprising:

preparing the first lens substrate and the second lens substrate, wherein the first lens substrate includes a plurality of the lens portions 1a formed on one surface of the first lens substrate and includes the first resin portion on the other surface of the first lens substrate, a surface of the first resin portion includes a plurality of the lens portions 1b such that optical axes of the lens portions 1a coincide with optical axes of the corresponding lens portions 1b, the second lens substrate includes the second resin portion arranged on one surface of the second lens substrate, and a surface of the second lens substrate includes a plurality of the lens portions 2a;

arranging the first lens substrate and the second lens substrate such that the surface of the first resin portion including the plurality of lens portions 1b and the surface of the second resin portion including the plurality of lens portions 2a face each other, and adjusting positions of the first lens substrate and the second lens substrate;

joining the surface of the first resin portion and the surface of the second resin portion together with an adhesive after adjusting positions of the first lens substrate and the second lens substrate; and cutting the first lens substrate and the second lens substrate to form image pickup lenses each comprising a combination of the first lens block and the second lens block, after joining the surface of the first resin portion and the surface of the second resin portion.

19. The method of claim 18, wherein when joining the surface of the first resin portion and the surface of the second resin portion, the first resin portion and the second resin portion are joined together such that combinations of the lens portion 1b and the lens portion 2a facing each other are sealed between the first resin portion and the second resin portion with the adhesive.

20. A method for manufacturing an image pickup apparatus comprising the image pickup lens of claim 1, comprising:

preparing the first lens substrate and the second lens substrate, wherein the first lens substrate includes a plurality of the lens portions 1a formed on one surface of the first lens substrate and a plurality of the lens portions 1b formed on the other surface of the first lens substrate such that optical axes of the lens portions 1a coincide with optical axes of the corresponding lens portions 1b, and the second lens substrate includes a plurality of the lens portions 2a formed on one surface of the second lens substrate;

arranging the first lens substrate and the second lens substrate such that the plurality of lens portions 1b and the plurality of lens portions 2a face each other, and adjusting positions of the first lens substrate and the second lens substrate;

joining the first lens substrate and the second lens substrate after adjusting positions of the first lens substrate and the second lens substrate;

adjusting positions of the first and second lens substrates which are joined together and an image-pickup-element substrate including a plurality of image pickup elements, and joining the first and second lens substrates and the image-pickup-element substrate together, cutting the first and second lens substrates and the image-pickup-element substrate which are joined together, to form image pickup lenses each comprising a combination of the first lens block, the second lens block, and the image pickup element, after joining the first and second lens substrates and the image-pickup-element substrate together.

21. The method of claim 20, wherein the first lens substrate and the second lens substrate are joined together through a spacer member with an adhesive after adjusting positions of the first lens substrate and the second lens substrate, and the first lens substrate, the second lens substrate, the spacer member, and the image-pickup-element substrate which are joined together, are cut to form image pickup lenses each comprising a combination of the first lens block, the second lens block, and the image pickup element, after joining the first and second lens substrates and the image-pickup-element substrate together.

22. A method for manufacturing an image pickup apparatus comprising the image pickup lens of claim 13, comprising:

preparing the first lens substrate and the second lens substrate, wherein the first lens substrate includes a plurality of the lens portions 1a formed on one surface of the first lens substrate and includes the first resin portion on the other surface of the first lens substrate, a surface of the first resin portion includes a plurality of the lens portions 1b such that optical axes of the lens portions 1a coincide with optical axes of the corresponding lens portions 1b, the second lens substrate includes the second resin portion arranged on one surface of the second lens substrate, and a surface of the second lens substrate includes a plurality of the lens portions 2a;

arranging the first lens substrate and the second lens substrate such that the surface of the first resin portion including the plurality of lens portions 1b and the surface of the second resin portion including the plurality of lens portions 2a face each other, and adjusting positions of the first lens substrate and the second lens substrate;

joining the surface of the first resin portion and the surface of the second resin portion together with an adhesive, after adjusting positions of the first lens substrate and the second lens substrate;

adjusting positions of the first and second lens substrates which are joined together and a image-pickup-element substrate including a plurality of image pickup elements, and joining the first and second lens substrates and the image-pickup-element substrate together;

cutting the first lens and second lens substrates and the image-pickup-element substrate which are joined together, to form image pickup lenses each comprising a combination of the first lens block, the second lens block, and the image pickup element, after joining the first and second lens substrates and the image-pickup-element substrate together.

* * * * *